(12) United States Patent
Coyne

(10) Patent No.: US 8,935,297 B2
(45) Date of Patent: Jan. 13, 2015

(54) METHOD AND SYSTEM FOR THE MANAGEMENT OF PROFESSIONAL SERVICES PROJECT INFORMATION

(76) Inventor: Patrick J. Coyne, Washington, DC (US)

( * ) Notice: Subject to any disclaimer, the term of this patent is extended or adjusted under 35 U.S.C. 154(b) by 1525 days.

(21) Appl. No.: 10/315,160

(22) Filed: Dec. 10, 2002

(65) Prior Publication Data

US 2003/0144969 A1 Jul. 31, 2003

Related U.S. Application Data

(60) Provisional application No. 60/337,158, filed on Dec. 10, 2001.

(51) Int. Cl.
*G06F 17/30* (2006.01)
*G06Q 10/06* (2012.01)
*G06Q 10/10* (2012.01)
*G06Q 30/02* (2012.01)

(52) U.S. Cl.
CPC .......... *G06F 17/30569* (2013.01); *G06Q 10/06* (2013.01); *G06Q 10/10* (2013.01); *G06Q 30/0283* (2013.01)
USPC ............. 707/803; 707/809; 707/812; 705/12; 705/13; 705/310; 705/311; 717/120

(58) Field of Classification Search
CPC ................................ G06F 17/30; G06F 17/00
USPC .................................................. 709/202, 237
See application file for complete search history.

(56) References Cited

U.S. PATENT DOCUMENTS

| | | | |
|---|---|---|---|
| 3,554,114 A | 1/1971 | McPhail | |
| 3,554,182 A | 1/1971 | Whitacre et al. | |
| 3,554,249 A | 1/1971 | Arnelo et al. | |
| 3,554,357 A | 1/1971 | Molins et al. | |
| 3,554,439 A | 1/1971 | Sigl | |
| 3,554,450 A | 1/1971 | D'Muhala | |
| 3,554,451 A | 1/1971 | Aghnides | |
| 3,555,194 A | 1/1971 | Goto | |
| 3,555,293 A | 1/1971 | Shannon et al. | |
| 3,555,988 A | 1/1971 | Wagner | |

(Continued)

OTHER PUBLICATIONS

Macromedia, "Connecting to Oracle Databases," Macromedia Inc., 2001, pp. 1-7.

(Continued)

*Primary Examiner* — Farhan Syed
(74) *Attorney, Agent, or Firm* — MH2 Technology Law Group, LLP

(57) ABSTRACT

A method and system are provided for the transfer and/or aggregation of data and, in particular, integrating data used in managing a professional services practice. The invention preferably transfers and/or aggregates data relating to the identity of clients and matters for whom professional services are being rendered with data relating to the work which data may be maintained in inconsistent, proprietary formats, comprising one or more of the following types of information: accounting; budgeting; docketing; time and billing; work product; word processing; records; project management; and/ or other information relating to the professional services. The system of the present invention preferably comprises data storage and data processing means adapted to use the data in substantially portable and/or application-independent format, and/or and transfer or aggregate data between common, and/or proprietary data formats.

13 Claims, 18 Drawing Sheets

(56) References Cited

U.S. PATENT DOCUMENTS

| | | |
|---|---|---|
| 3,556,035 A | 1/1971 | Schliehen |
| 3,558,823 A | 1/1971 | Brilliant et al. |
| 3,562,435 A | 2/1971 | Joel, Jr. |
| 3,565,449 A | 2/1971 | Ascencio et al. |
| 3,590,162 A | 6/1971 | Dallemagne et al. |
| 3,610,905 A | 10/1971 | Herron et al. |
| 3,621,216 A | 11/1971 | Wortzman |
| 3,621,387 A | 11/1971 | Smith et al. |
| 3,646,520 A | 2/1972 | Spencer |
| 3,671,951 A | 6/1972 | Lee |
| 3,818,838 A | 6/1974 | Morton, Jr. |
| 3,898,373 A | 8/1975 | Walsh |
| 4,187,629 A | 2/1980 | Yamada |
| 4,293,950 A | 10/1981 | Shimizu et al. |
| 4,315,315 A | 2/1982 | Kossiakoff |
| 4,485,439 A | 11/1984 | Rothstein |
| 4,847,755 A | 7/1989 | Morrison et al. |
| 4,875,162 A | 10/1989 | Ferriter et al. |
| 4,924,426 A | 5/1990 | Kameda et al. |
| 5,233,513 A | 8/1993 | Doyle |
| 5,241,635 A | 8/1993 | Papadopoulos et al. |
| 5,289,272 A * | 2/1994 | Rabowsky et al. ............ 725/76 |
| 5,327,115 A | 7/1994 | Swierczek |
| 5,341,476 A | 8/1994 | Lowell |
| 5,371,854 A | 12/1994 | Kramer |
| 5,377,337 A | 12/1994 | Antognini et al. |
| 5,381,332 A | 1/1995 | Wood |
| 5,392,412 A | 2/1995 | McKenna |
| 5,412,800 A | 5/1995 | Bril et al. |
| 5,423,038 A | 6/1995 | Davis |
| 5,448,598 A | 9/1995 | Yousefi et al. |
| 5,454,039 A | 9/1995 | Coppersmith et al. |
| 5,454,104 A | 9/1995 | Steidlmayer et al. |
| 5,507,004 A | 4/1996 | Mito |
| 5,524,253 A * | 6/1996 | Pham et al. ................ 709/202 |
| 5,623,505 A | 4/1997 | Funamoto et al. |
| 5,655,086 A | 8/1997 | Jury et al. |
| 5,737,607 A * | 4/1998 | Hamilton et al. ........... 719/316 |
| 5,761,511 A | 6/1998 | Gibbons et al. |
| 5,761,674 A | 6/1998 | Ito |
| 5,767,848 A | 6/1998 | Matsuzaki et al. |
| 5,790,790 A * | 8/1998 | Smith et al. ................. 709/206 |
| 5,819,092 A * | 10/1998 | Ferguson et al. ............ 717/113 |
| 5,826,252 A | 10/1998 | Wolters, Jr. et al. |
| 5,838,906 A * | 11/1998 | Doyle et al. ................ 715/205 |
| 5,845,283 A * | 12/1998 | Williams et al. .................. 1/1 |
| 5,852,714 A | 12/1998 | Tseng et al. |
| 5,890,131 A | 3/1999 | Ebert et al. |
| 5,895,468 A * | 4/1999 | Whitmyer, Jr. ............ 705/26.1 |
| 5,909,688 A | 6/1999 | Yoshioka et al. |
| 5,920,873 A | 7/1999 | Van Huben et al. |
| 5,950,201 A | 9/1999 | Van Huben et al. |
| 5,957,699 A * | 9/1999 | Peterson et al. ............ 434/350 |
| 5,999,200 A | 12/1999 | Harkin et al. |
| 6,006,328 A | 12/1999 | Drake |
| 6,032,189 A | 2/2000 | Jinzenji et al. |
| 6,035,293 A | 3/2000 | Lantz et al. |
| 6,039,251 A * | 3/2000 | Holowko et al. ............ 235/380 |
| 6,049,776 A | 4/2000 | Donnelly et al. |
| 6,052,512 A * | 4/2000 | Peterson et al. ............. 709/220 |
| 6,058,264 A | 5/2000 | Glaser |
| 6,069,627 A | 5/2000 | Conrad et al. |
| 6,070,182 A | 5/2000 | Rao et al. |
| 6,091,397 A | 7/2000 | Lee |
| 6,094,654 A | 7/2000 | Van Huben et al. |
| 6,094,684 A * | 7/2000 | Pallmann ................. 709/227 |
| 6,202,073 B1 | 3/2001 | Takahashi |
| 6,215,783 B1 | 4/2001 | Neyman |
| 6,256,773 B1 | 7/2001 | Bowman-Amuah |
| 6,308,164 B1 | 10/2001 | Nummelin et al. |
| 6,321,204 B1 | 11/2001 | Kazami et al. |
| 6,327,571 B1 | 12/2001 | Khayat et al. |
| 6,332,163 B1 | 12/2001 | Bowman-Amuah |
| 6,339,832 B1 | 1/2002 | Bowman-Amuah |
| 6,345,239 B1 | 2/2002 | Bowman-Amuah |
| 6,370,573 B1 | 4/2002 | Bowman-Amuah |
| 6,405,364 B1 | 6/2002 | Bowman-Amuah |
| 6,426,948 B1 | 7/2002 | Bowman-Amuah |
| 6,427,132 B1 | 7/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,449,588 B1 | 9/2002 | Bowman-Amuah |
| 6,477,580 B1 | 11/2002 | Bowman-Amuah |
| 6,477,665 B1 | 11/2002 | Bowman-Amuah |
| 6,487,599 B1 * | 11/2002 | Smith et al. ................. 709/229 |
| 6,496,850 B1 | 12/2002 | Bowman-Amuah |
| 6,501,473 B1 | 12/2002 | Hayes et al. |
| 6,502,213 B1 | 12/2002 | Bowman-Amuah |
| 6,516,326 B1 * | 2/2003 | Goodrich et al. ............ 707/602 |
| 6,526,426 B1 | 2/2003 | Lakritz |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,542,593 B1 | 4/2003 | Bowman-Amuah |
| 6,549,949 B1 | 4/2003 | Bowman-Amuah |
| 6,550,057 B1 | 4/2003 | Bowman-Amuah |
| 6,556,659 B1 | 4/2003 | Bowman-Amuah |
| 6,571,282 B1 | 5/2003 | Bowman-Amuah |
| 6,578,068 B1 | 6/2003 | Bowman-Amuah |
| 6,591,278 B1 | 7/2003 | Ernst |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,611,867 B1 | 8/2003 | Bowman-Amuah |
| 6,615,199 B1 | 9/2003 | Bowman-Amuah |
| 6,615,253 B1 | 9/2003 | Bowman-Amuah |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,662,357 B1 | 12/2003 | Bowman-Amuah |
| 6,697,824 B1 | 2/2004 | Bowman-Amuah |
| 6,704,303 B1 | 3/2004 | Bowman-Amuah |
| 6,707,812 B1 | 3/2004 | Bowman-Amuah |
| 6,714,928 B1 | 3/2004 | Calow |
| 6,715,145 B1 | 3/2004 | Bowman-Amuah |
| 6,742,015 B1 | 5/2004 | Bowman-Amuah |
| 6,842,906 B1 | 1/2005 | Bowman-Amuah |
| 6,954,220 B1 | 10/2005 | Bowman-Amuah |
| 7,020,697 B1 * | 3/2006 | Goodman et al. ............ 709/223 |
| 7,139,999 B2 | 11/2006 | Bowman-Amuah |
| 7,188,110 B1 * | 3/2007 | Ludtke et al. ................ 382/115 |
| 7,289,964 B1 | 10/2007 | Bowman-Amuah |
| 7,467,198 B2 * | 12/2008 | Goodman et al. ............ 709/223 |
| 7,711,691 B2 | 5/2010 | Coyne et al. |
| 7,716,333 B2 | 5/2010 | Bowman-Amuah |
| 7,734,793 B2 | 6/2010 | Bowman-Amuah |
| 7,774,408 B2 | 8/2010 | Sinha et al. |
| 7,813,822 B1 * | 10/2010 | Hoffberg ........................ 700/94 |
| 7,899,721 B2 | 3/2011 | Bowman-Amuah |
| 7,921,290 B2 * | 4/2011 | Albert et al. .................. 713/168 |
| 2002/0035697 A1 * | 3/2002 | McCurdy et al. ............. 713/200 |
| 2002/0073042 A1 * | 6/2002 | Maritzen et al. ................ 705/64 |
| 2002/0161733 A1 | 10/2002 | Grainger |
| 2002/0178229 A1 | 11/2002 | Sinha et al. |
| 2003/0056096 A1 * | 3/2003 | Albert et al. .................. 713/168 |
| 2003/0088784 A1 * | 5/2003 | Ginter et al. .................. 713/189 |
| 2003/0144969 A1 | 7/2003 | Coyne |
| 2003/0144970 A1 | 7/2003 | Coyne |
| 2004/0030705 A1 | 2/2004 | Bowman-Amuah |
| 2004/0030749 A1 | 2/2004 | Bowman-Amuah |
| 2005/0060348 A1 | 3/2005 | Coyne et al. |
| 2005/0080665 A1 | 4/2005 | Bowman-Amuah |
| 2006/0059253 A1 * | 3/2006 | Goodman et al. ............ 709/223 |
| 2007/0053513 A1 * | 3/2007 | Hoffberg ...................... 380/201 |
| 2009/0307577 A1 | 12/2009 | Lee |
| 2010/0214059 A1 | 8/2010 | Twitchell, Jr. |
| 2010/0214060 A1 | 8/2010 | Twitchell, Jr. |
| 2010/0214061 A1 | 8/2010 | Twitchell, Jr. et al. |
| 2011/0055042 A1 | 3/2011 | Bowman-Amuah |
| 2011/0231391 A1 | 9/2011 | Coyne |
| 2012/0323625 A1 | 12/2012 | Lee |

(56) References Cited

U.S. PATENT DOCUMENTS

| | | |
|---|---|---|
| 2012/0323748 A1 | 12/2012 | Lee |
| 2012/0323802 A1 | 12/2012 | Lee |
| 2012/0323803 A1 | 12/2012 | Lee |
| 2012/0323804 A1 | 12/2012 | Lee |
| 2012/0330851 A1 | 12/2012 | Lee |
| 2013/0013295 A1 | 1/2013 | Lee |
| 2013/0013519 A1 | 1/2013 | Lee |
| 2013/0013520 A1 | 1/2013 | Lee |
| 2013/0013521 A1 | 1/2013 | Lee |
| 2013/0054290 A1 | 2/2013 | Coyne |
| 2013/0054592 A1 | 2/2013 | Coyne |
| 2013/0054655 A1 | 2/2013 | Coyne |
| 2013/0054657 A1 | 2/2013 | Coyne |
| 2013/0054681 A1 | 2/2013 | Coyne |

OTHER PUBLICATIONS

Non-Final Office Action dated Mar. 20, 2013, U.S. Appl. No. 13/594,428, filed Aug. 24, 2012, pp. 1-24.
Non-Final Office Action dated Mar. 29, 2013, U.S. Appl. No. 13/593,827, filed Aug. 24, 2012, pp. 1-27.
Non-Final Office Action dated Mar. 29, 2013, U.S. Appl. No. 13/593,924, filed Aug. 24, 2012, pp. 1-27.

* cited by examiner

METHOD AND SYSTEM FOR THE MANAGEMENT OF PROFESSIONAL SERVICES PROJECT INFORMATION

PRIOR APPLICATION

This application claims priority on U.S. Provisional Application No. 60/337,158, filed Dec. 10, 2001, which is incorporated by reference, as if fully set forth herein.

FIELD OF THE INVENTION

The present invention relates to a method and system for, and apparatus adapted to, manage information used in a business and, in particular, a professional services practice. The present invention preferably facilitates the transfer, compilation, aggregation, integration, and/or distribution of data. The data may be in: one or more software applications; common or proprietary, structured or unstructured, formats; centralized or distributed database(s); and/or compatible or incompatible formats.

Data typically must be transferred, cleaned, converted, and/or coded from a native format into the recipient's format, before it can be used by the recipient. Frequently, incompatibility is so severe that the data may need to be re-keyed or otherwise reentered. Data may be coded in one format, converted to another format so that it can be transferred or exchanged, and converted back into the first or other proprietary formats for subsequent processing. Third parties may not have access to the formats used at various stages of processing, requiring further conversion.

BACKGROUND OF THE INVENTION

Professional service(s) practices rely on information from disparate sources. A medical practice, for example, may maintain: patient identifying and contact information; medical history records; financial and accounting software to generate bills, process insurance and third party payment claims, and perform accounts receivable, accounts payable, general ledger, and payroll functions; and various other systems. In a hospital or clinical setting, separate software systems typically manage radiology, pharmacy, laboratory, and nursing functions. Private physicians typically use separate software systems for scheduling; accounting; word processing; and retrieving laboratory records. In addition, various expert systems have been developed to assist in diagnosing conditions and devising appropriate treatment therapies. Other software systems provide assistance in selecting appropriate tests and interpreting results.

As a further example, a law practice typically maintains information relating to: clients; matters being worked on for those clients; projects undertaken in connection with those matters; tasks that are necessary to complete those projects, and events relating to those matters and/or projects. These may include, without limitation: identifying and/or contact information for clients, potential clients, adversaries, counsel, foreign associate counsel, witnesses, vendors, experts, investigators, and others involved in the matter or project; billing information; documents, references, exhibits, and other records; email and other electronic records; fact and legal research; correspondence; pleadings; docketing; finance, budgeting, timekeeping, expense, billing, general ledger, accounts receivable, accounts payable, collection, and other financial data; and, potentially, a wide variety of other project management tools.

Document management and/or document assembly systems are typically employed in a legal practice to generate, maintain, manage, and retrieve work product. Many legal practices maintain "libraries" of prior work product, work flow forms, and/or "precedents." These resources help maintain quality control, providing a knowledge base for training younger attorneys and efficiently generating work product. Graphics, modeling, presentation, and visualization tools are becoming more widely used. In addition, as in medicine, various expert systems are used, particularly in specialized areas of practice, such as litigation, securities, real estate, intellectual property, and others. More recently, the demand for case management systems has increased, particularly among in-house law departments. Case management systems known by the present inventor prior to the present invention, however, shared several of the deficiencies identified below.

Professional service(s) practices typically maintain these types of information in various custom, proprietary, specialized, mass-marketed, and/or open software applications. These applications are not adapted to, and in many instances, are not capable of, cooperating or communicating with one another. Data, therefore, must frequently be converted or re-entered in various applications.

One of the greatest strengths of modern computer networks is their adaptability. They support a wide variety of different software applications and enable users to share work product. The users may be permitted to tailor their computing environment to their individual work patterns. This is highly desirable, yet, this pattern of individualized computing fosters a proliferation of software applications, operating systems, and network management applications. The architecture of computer networks has compounded the difficulties of managing these disparate systems.

Most networks combine various hardware components: personal computers; network and mainframe components; servers and routers; desk tops, laptops, and hand-helds; remote access devices; personal digital assistants (PDAs); wireless access devices; various output devices, and a bewildering array of accessories. Each typically has a different operating system; of different vintage, quality, and capability. Apart from the substantial challenges this imposes on network managers and systems administrators, it has made the ready transferability of data between components more difficult, if not impossible.

In a typical law practice, for example, information systems and software may include, without limitation:
  Hard copies of documents, files, specimens, and exhibits;
  Physical exhibits and samples;
  Electronic records;
  Audio, video, voice mail, and other records;
  Network Operating Systems software (typically some variant of Windows, i.e., 2000, NT, XP, 98, or 95; IBM OS2; Apple; etc.);
  Records Management Systems (files, bar coding, indexers, or specialized records management applications);
  Document Assembly Systems (such as "IPDAS" in an intellectual property practice setting, or other document assembly systems);
  Document Management Systems (such as Hummingbird; PC DOCS; SoftSolutions; iManage; etc.);
  "Knowledge Management" Systems (which are typically customized or proprietary software or some modified version of a Document Management System);
  Email systems (ccmail, Notes mail, Microsoft mail, etc.);
  Docketing systems (for example, CPI, Dennemeyer, IP Master; Patsy, IPPO, etc., for intellectual property practices; and other docketing systems for securities, tax, litigation, or other practice areas);

Word processing systems (WordPerfect, Microsoft Word, etc.);

Scheduling and calendaring systems (Lotus Notes, Microsoft Outlook, etc.);

Relationship Management and/or Contact Information (InterAction; Outlook; Notes; Elite Apex; Aptus; customized or proprietary software; etc.);

Litigation Support (Summation; LiveNoteNideoNote; Access; CaseMap/TimeMap; Concordance; Trial Director; JFS Litigator's Notebook; Sanction; Folio Views; iConnect; DB Textworks; Isys; Introspect; BRS Search; RealLegal; E-tech; Ipro; etc.);

Electronic evidence service vendors (Ontrack; Electronic Evidence; Applied Discovery; Fios; Daticon; Deloitte & Touche; and others);

Electronic portals (such as those supplied by vendors such as SV Technology; Plumtree; Sequoia; and others);

Desktop fax software (RightFax; Legal Fax; and others);

Time entry systems (DTE; Carpe Diem; CMS Open; Elite; custom or proprietary systems; etc.);

Accounting systems (Elite; CMS Open; Elite for Windows NT; TMC; Rippe & Kingston; custom or propietary in-house; etc.);

Database applications (Lotus Notes, Microsoft Excel, Microsoft Access, Corel Quatro Pro, FoxPro, Lotus 123, Concordance, etc.);

Presentation applications (Microsoft PowerPoint; Corel Presentations; Sanction; Trial Director; etc.);

Project Management support systems (Microsoft Project; Project Gateway, etc.);

Critical path, probability assessment, and risk analysis tools (such as TreeAge software, etc.);

Various specialty applications (such as project management, flowcharting, PERT and GANT charting, budgeting tools, etc.);

Case Management systems (LawPack (Hummingbird); Corprasoft; Elite Information Group; Miratech; ProLaw (West Group); RealLegal; and PWC and other systems support vendors); and Potentially, a wide variety of other applications software. Data accessed by these various applications may be maintained centrally and/or on a distributed basis. Prior to the present invention, data was not readily transferable between the various applications used in a professional service(s) practice. Typically the data was maintained in a format that was proprietary and, in some cases, exclusive to the single application, or at least not readily portable to other applications.

Docketing illustrates some of the problems posed by the lack of data transferability in a law practice setting. Both counsel and their clients desire access to certain information maintained in a docket. Professional liability carriers typically require independence and redundancy in docketing, or calendaring, systems. A law firm typically maintains: organization-wide; department-wide; and/or practice group-wide docketing systems, in addition to each individual attorney or professional maintaining their own docket. The organization or department-wide system is typically secured; a limited number of individuals have write access and others have read-only access. While these restrictions help preserve the security, integrity, and reliability of the data, they impair the transferability of the data.

Many docketing systems now include a web-access feature that allows the client, or others outside the law firm to access the data. Yet, these systems generally remain: proprietary; rigid in their formatting; and rigid in their ability to transfer or exchange information with other software applications and to accept related project management and/or financial information. More important, a corporate client retaining multiple outside law firms would be forced to access multiple web sites in order to collect the desired docketing information from each. Centralizing the docket by a third party to derive the client form, the burden shifts to each law firm which still requires visiting several different sites to collect the desired docketing information about its clients. While the client's interests should predominate relative to those of the outside law firm, secure and ready access by all concerned is preferable.

Extranets remain complex and limited in their functionality. Web-based systems have not resolved the fundamental problem that pertinent data is stored in multiple inconsistent formats.

Data maintained in a docketing system (such as addresses, client and matter identifying information, deadline dates, events, tasks, etc.), may also be needed in accounting, word processing, litigation support, case management, risk analysis, database, and other applications. It may be needed by persons both inside and outside the organization. The rigidity of most docketing systems, however, impairs or prevents the data from being readily exchanged with other applications. Consequently, data is typically manually transferred (cut and pasted) or simply key-entered repeatedly in each application in which it is needed, presenting multiple additional opportunities for errors and data corruption.

As a further example, address book applications provide a stark illustration of some of the inefficiencies and problems associated with the lack of application-independence and portability of data used in a professional services practice. In a typical law office, an address is needed by several professionals and support staff: the accounting system to clear conflicts and to open new client matters against which to accrue time and charges; the docketing system, the word processing and document management systems to enable professionals to generate work product, lists of specialized vendors, such as foreign associate counsel; the relationship management systems to enable professionals to conduct client development and business development activities; and the various handheld and portable devices in which the professionals may wish to maintain their personal address data.

The address of a new client, for example, may be entered (typically manually) in an attorney's personal address list when he or she solicits the prospective client initially. In the course of generating or sending materials soliciting the prospective client, the address may be reentered and then maintained in various distributed applications such as business development lists, word processing systems, document management systems, and/or relationship management systems. The same address may even be entered by multiple professionals in the same applications. If the client engages the firm, the address, among other information, will be reentered—typically manually—into the firm's conflicts checking, accounting, and/or time and billing systems. The address will typically be reentered—again manually—into the firm's docketing and/or calendaring systems. As files are created, it will be reentered—again typically manually—in the firm's filing systems. So too, as work product is generated, it is typically reentered into the individual documents as they are created, although one or more of these iterations of the address may be captured at some point in a document management and/or forms generation system, from which it can be used in other documents. As bills are generated, the address is accessed again—either by entering it anew, or from one of the multitude of locations where it already resides—to generate an invoice and cover letter.

As a result, the same intended address now resides in multiple locations in the firm's computer network, each likely being different and possibly containing incorrect and inconsistent information, style, and formatting. At each point where it was entered or used, time is wasted in reentering the same information. At each entry point, there are new opportunities for additional errors being introduced.

These problems extend to databases that are expressly intended to resolve these problems. For example, some relationship management systems are expressly designed to be compatible with certain email, calendaring, and address systems, such as Microsoft Outlook and/or Lotus Notes. Yet, while the data may be portable between the applications to a greater or lesser degree, incompatibilities remain, that have resulted in corruption or loss of the data, or general protection faults. For example, errors and inconsistencies frequently result between Palm databases, Notes databases, and relationship management databases that purport to contain the same information. The format of the data is different in all three and, although some fields are substantially the same, others are different, truncated, or missing. The data is not reliably transferred between them in practice, due to software flaws and/or incompatibilities. Moreover, the undue complexity of these systems makes them difficult for even sophisticated users to use competently. In Applicant's experience, these problems extend to all of the types of data used in a professional service(s) practices.

Some mass-marketed applications have claimed portability, while others have simply ignored or actively resisted it. Generally, word processing applications, due to their widespread use, have been under greater pressure to make their data portable than more specialized applications, such as docketing, accounting, and time and billing applications. Prior to the present invention, none of the applications of which Applicant is aware have achieved the desired level of portability, let alone substantial application independence of their data, with the possible exceptions of applications, such as Adobe Acrobat, that specifically attempt to enhance the portability of data.

Applications, such as Microsoft Word, WordPerfect, PowerPoint, Corel WordPerfect, and/or Corel QuartoPro have claimed at various times that some data was substantially portable between several of these applications. Even these limited applications, however, encountered substantial problems in transferring data from one application to another prior to the present invention. Docketing and accounting systems have generally been even more problematic with respect to the portability and/or application-independence of their data.

In some businesses outside the professional service(s) sector, these incompatibility problems have been addressed by massive integration of centralized database applications. This is typically done, enterprise-wide, on an Oracle, SAS, SAP, or other centralized platform, integrating financial and operational data. In a professional services setting, such as law and/or medicine, centralized database applications have generally been disfavored for several reasons. First, the cost and complexity of these types of integration projects have been prohibitive. Second, the rapid evolution of hardware and software further contraindicate the massive investment required for centrally integrated databases. Third, the distributed nature of professional services, as well as security concerns, teach away from massive integration in a professional services setting.

Distributed systems provide lower overall cost and greater flexibility, as well as enhanced availability and security, in the event of a failure of, or attack on, one or more network components. In addition, the need for access to the data by multiple independent parties (clients, their outside counsel, vendors, and others), continues to favor distributed solutions.

Thus, there has long been an unresolved need for secure, reliable, simple data transfer between applications. Prior known approaches have failed to meet this long-felt and unresolved need, particularly in a professional service(s) setting. The commercial software industry has long overlooked professional service(s) markets. Professional service(s) markets, therefore, have had to rely on either mass-marketed software applications that are not adapted to their particular needs, and/or customized and/or proprietary solutions that are expensive, complex, and limited in their flexibility and adaptability.

Mass Marketed Software Applications

No mass-marketed software application is "best in class" in every function it performs (e.g., email, scheduling, calendaring, word processing, document management, spreadsheet, docketing, etc.). Applications, or suites of applications, may be considered by some users superior in certain functions and inferior in others. Lawyers in private practice, in particular, need to interface with multiple clients who may be using different software applications for performing the same function. Users end up securing multiple, competing software applications. This results in duplication in purchasing and training, while only certain programs or features of each application are actually used.

In principle, data should be application-independent. Any application should be able to access the data. In practice, however, databases are built for specific applications. Commentators have long recognized that, "[t]he biggest challenge is to find ways of cutting the ties that inherently bind programs to specific computers and to other programs." W. Wayt, Gibbs, "Trends in Computing, Software's Chronic Crisis," SCIENTIFIC AMERICAN, September 1994, at 94. A need exists for consumers to meld the best components of various programs and/or suites to meet the user's, rather than the programmer's, software vendor's, or reseller's needs. A consumer focus on data transferability, however, is largely absent from software development. Rather, each software application is typically written in a different, and incompatible, proprietary format.

Although many mass-marketed applications advertise that they are "open," they are fundamentally proprietary systems and are "open" only to the extent that the vendor has decided to enable development of certain compatible applications. These proprietary formats are generally not compatible with other software applications. Even in those situations in which the software is marketed with the express representation that data is transferable between them (such as between Microsoft Word and Corel WordPerfect, or between various applications in a single manufacturer's suite of applications software such as Microsoft Office), frequently, they are not.

During the 1990's, law firm accounting systems, such as TMC and Elite, were sold based upon the representations that data was freely transferred from these proprietary systems to more easily used, mass-marketed, software such as Excel spreadsheets. In practice, however, this was not the case. Transferring data was cumbersome, time consuming, and required manual intervention and conversion, typically, with specialized assistance from personnel specifically trained in the proprietary software.

Such incompatibilities regularly cause catastrophic failures. The "blue screen of death," received when a general protection fault occurs in the Windows operating system, has become a regular feature of network and PC-based computing. THE ECONOMIST at 23, Col. 3, II. 10-12 (Nov. 13, 1999). Nor has the advent of Windows XP and other operating systems resolved these problems. One of the advertised benefits of Windows XP was that it finally enables software applications to transfer data between one another. This marketing simply underscores the failure of prior known approaches to resolve this fundamental and long-felt need. Moreover, Windows XP continues to suffer faults, with a "Task List" interface provided to terminate the offending application(s). Thus, rather than correcting or avoiding the incompatibilities that give rise to such failures, the generally accepted solution remains to terminate application(s) and/or reboot the computer.

These types of failures are unacceptable in a modern business environment. Instead, simplicity, transferability, speed, reliability, and security are required. Mass-marketed application software companies have not met these challenges. Instead they continue to supply software products that include known—and remediable—defects. In 2001, Microsoft Corporation ran a "99999" national advertising campaign—alluding to Six Sigma (3.4 defects in a million opportunities) reliability for its server products. Similarly, during 2002, Oracle ran an "Unbreakable Linux" campaign. In reality, mass marketed business application software of the type used in professional services practices has come nowhere near achieving these levels of reliability.

Incompatibility, flowing from the proprietary nature of various software platforms, ultimately requires that data be converted or that the same information be re-entered in multiple applications. This is wasteful and introduces multiple opportunities for error in data entry, maintenance, and retrieval. Proprietary software applications also require extensive investment in training, retraining, and support. Typically, the more powerful the tool, the more rigorous the training requirements. In a professional service(s) practice, such as medicine or law, the individuals who could most benefit from these tools are the individuals whose time is most highly valued and whom the organization can least afford the extensive investment in training, retraining, and support time required to gain proficiency in multiple applications.

Ideally, the data used in a business should be exchanged on a commodity basis, the data should be application-independent. Although distributed PC-based networks could have fostered that result, they have had the opposite result. PC-based network systems have fostered the proliferation of incompatible, proprietary applications software. These proprietary systems have resulted in: maintenance problems; undue complexity in systems architecture and design; excessive network systems support requirements; the need for duplicate copies of applications software; increased systems maintenance; increased cost; impaired access to data; increased training time and expense; diversion of professional time to non-productive uses; and, ultimately, impairment of access to the information needed to run the practice or business.

Edward Tenner has compared the development of computer technology to an arm's race: arms races "help mainly the armorers," in this case the developers and vendors of computer systems, rather than users. Edward Tenner, "*High-Tech Tantalus*" THE WILSON QUARTERLY, Summer 1990, at 102-05. Training time must be balanced against the value of upgrades, which sap even more resources. Managers demand more and more data from sophisticated financial and statistical software. The ease of generation and revision of documents begets more documents and more revisions. Data expands to fill ever cheaper storage technology. As a result, the paperless office never arrived. The result has been information overload. Id. New technologies have enabled greater productivity, yet, have done little to guide that effort in a productive manner. Automation alone does not make an organization more efficient or productive. Recognizing and addressing these various revenge effects are key to improving the efficiency and productivity of a business organization. Id.

Lack of Maturity of the Software Industry

In spite of Tenner's admonitions, more than a dozen years ago, the software industry has done little or nothing to address the fundamental incompatibility and lack of reliability of their products. Rather, with the proliferation of application software options, the problem has worsened, markedly.

Nor do large-scale software integration projects offer a viable alternative. In 1994, W. Wayt Gibbs, published an article, entitled "Software's Chronic Crisis" SCIENTIFIC AMERICAN, September 1994, at 86, in which he commented: "[t]he average software development project overshoots its schedule by half; larger projects generally do worse. And some three quarters of all large systems are 'operating failures' that either do not function as intended or are not used at all. Gibbs notes, sarcastically, that the art of programming has taken 50 years of continual refinement to reach this stage." Id. at 86-87.

Gibbs chronicles a number of high profile software failures and attempts to deduce some of their root causes. These include a pervasive lack of quality and repeated systems failures suffered by various software systems. Among the software engineering failures Gibbs chronicles are: the baggage handling system at Denver International Airport; the loss of the Clementine space probe; the State of California's attempt to merge its driver and vehicle registration systems; the unsuccessful attempt to force the expansion of American Airline's successful "Sabre" reservation system to integrate hotel and car reservation bookings; the Federal Aviation Administration's replacement of it's air traffic control software with its failed "Advanced Automation System;" and other spectacular failures.

The term "software engineering" was coined in 1968 at a NATO Science Committee meeting, to describe: "the application of a systematic, disciplined, quantifiable approach to the development, operation, and maintenance of software." Id. at 87. Yet, more than thirty years later, most software continues to be "handcrafted from raw programming languages by artisans using techniques they neither measure nor are able to repeat consistently." Id. Software development is stuck in a pre-industrial stage of development, comparable to the stage of manufacturing prior to Eli Whitney's innovation of interchangeable parts that could be assembled by any skilled craftsman. Software "engineering" remains largely aspirational. Programmers' "acceptance that everything they produce will have defects—must change in response." Id. at 88.

Nor have distributed systems approaches proved successful in overcoming the lack of maturity of the software industry. In addition to the problems presented by order of magnitude growth every decade, undue complexity, lack of adequate documentation, and failure to integrate successive stages of evolution of a software product, the stresses imposed by "distributed systems" are substantial. "Software is buckling as well under tectonic stresses imposed by the inexorably growing demand for 'distributed systems'; programs that run cooperatively on many networked computers. Businesses are pouring capital into distributed information systems they hope to wield as strategic weapons. The inconsistency of software development can turn such projects into Russian roulette." Id.

In June of 1994, IBM's Consulting Group released a study of 24 leading companies that had undertaken large distributed systems: 55% cost more than expected; 68% overran their schedules; and 88% had to be substantially redesigned. Id. at 89. "The survey did not report one critical statistic: how reliably the completed programs ran. Often systems crash because they fail to expect the unexpected. Networks amplify this problem. 'Distributed systems can consist of a great set of interconnected single points of failure, many of which you have not identified beforehand . . . ' 'The complexity and fragility of these systems pose a major challenge.'" Id.

Gibbs emphasizes the lack of discipline and professionalism in the software industry. Although some researchers are addressing practical, repeatable solutions, most of the industry is not. The Software Engineering Institute has developed a Capability Maturity Model (CMM) for rating software development organizations. Its survey of over 261 organizations ranked over 75% at the lowest level—chaotic in their ability to create predictable software that meets their customer's needs. By late 1994, only two, Motorola's Indian programming team in Banglore, India, and Loral's on-board space shuttle team, received the highest rating, for having good management practices for software development. Id. at 90.

"Mass-market software producers, because they have no single customer to please, can take a belated and brute force approach to bug removal: they release the faulty product as a 'beta' version and let hordes of users dig up the glitches." Id. Although Microsoft Corporation prides itself that its software is "beta-tested" by tens of thousands of users, this system is expensive, inefficient, and, ultimately, ineffective. Most software developers cannot and do not secure even this ineffective, level of exposure. The result is a continuing stream of defective and faulty products. Id.

Software continues to be developed through an "evolutionary" approach, despite the persistent flaws of that process. "Clean room" approaches attempt to prevent the introduction of bugs, or build software systems from established prototypes of graphic interface components. They attempt to meld formal notations, correctness proofs, and statistical quality control with an evolutionary approach to software development. Id. at 91. This development approach attempts to grow systems, one function at a time, and certify the quality of each unit before integrating it into the architecture. Id. Unfortunately, these advances generally have not been adopted by producers of mass-market software, the type of software typically used in a business or professional service(s) setting.

In contrast to other engineering disciplines, such as Chemical Engineering, Software Engineering has steadfastly resisted progress toward professionalism. Mary M. Shaw, of Carnegie Mellon University, has described some of the common stages in the evolution of engineering disciplines: from craft and production to commercialization; and from commercialization and science to professional engineering. Id. at 92. The progression in software development from craft and production to commercial scale production was achieved decades ago. Yet, the development of scientific methods, and the merger of those methods with commercialization technologies into a professional engineering framework has yet to occur. It continues to encounter substantial resistance among the companies, managers, and engineers who produce these software products. As a result, productivity in software development has lagged behind that of most mature disciplines, including computer hardware engineering. Id. at 93.

One glaring example of the lack of professionalism in software development is the presence of "Easter Eggs" in mass-marketed software programs. For years, programmers have been hiding "surprises" in computer code. "Messages from the Hall of Tortured Souls", THE ECONOMIST, Dec. 18, 1999, at 75. Most popular software, including business, word processing, spreadsheet, Internet browsers, and others have undocumented "Easter eggs" hidden among their millions of lines of code: exploding Lara Croft (the lead character in the popular "Tomb Raider" computer games), a flight simulator in Microsoft Excel 97, a hidden pinball game in Windows Word 97, Monzilla in Netscape Navigator V 4.05; Monzilla being crushed by the Microsoft "e" mark in Microsoft Internet Explorer 5. Id.

The consumer is not offered the option to reject these deliberate and extraneous bits of software. One expert in computer security, Ross Anderson, at Cambridge University in Britain, has stated: "Easter Eggs are a telling symptom of poor quality control at many software companies . . . . Purchasers are right to be concerned; the great majority of computer-security failures result from the opportunistic exploitation of vulnerabilities that are discovered by chance. The software vendors should be concerned too; programmers who are so badly supervised that they can hide games for their friends' amusement can also hide time-bombs." Id. at 76.

Another indicator of the lack of professionalism in the development of mass-marketed software is the steadfast refusal of most software companies to stand behind the products they sell. Rather than provide consumers the types of warranties that are common in almost every other industry, software manufacturers continue to disclaim responsibility for their products, going so far—fifty years after their discipline was launched—as disclaiming that their products will function as intended and are fit for the express purposes for which they were sold.

Unlike the computer hardware industry, the software industry has failed to embrace consensus performance standards. "[M]ature engineering fields codify proved solutions in handbooks so that even novices can consistently handle routine designs, freeing more talented practitioners for advanced projects. No such handbook yet exists for software, so mistakes are repeated on project after project, year after year." W. Wyat Gibbs, SCIENTIFIC AMERICAN, September 1994, at 93.

In sum, the software industry in general, and the mass-marketed software segment of the industry in particular—the segment upon which most business and professional software users rely, has strongly resisted the trend to professionalism. Although researchers are investigating several promising approaches, these approaches are not yet generally accepted. Significant technical and cultural barriers remain to the success of these approaches. Id. at 95.

Proprietary Applications

Professional services markets have generally eschewed massive integration of data in favor of distributed solutions. Prior known approaches have typically involved creating yet another proprietary software application, that substitutes for the original application software or is used in parallel with it.

Christopher, et al., International Publication No. WO 9524010 A1, for Computer System for Managing Patient Care (Sep. 8, 1995) (U.S. application Ser. No. 09/502,598), discloses an integrated computer system for managing medical care of patients. Christopher discloses a centralized, proprietary computer system that handles the various functions in a medical office in a single proprietary application. Christopher's centralized application replaces—rather than works in concert with—various specialized, distributed applications that would otherwise perform each function. Christopher prompts entry of information by the user about a patient's medical history, physical examination, insurance coverage, and diagnosis. Christopher maintains a database that allows the physician to review and compare cost information for alternative treatments associated with the patient's diagnosis at the time of treatment.

Christopher expressly recognizes that "separate, incompatible software packages are often used for scheduling, accounting, word processing and retriev[al].... A number of expert systems have been developed in the past to assist the physician in clinical diagnosis. Other software systems are intended to assist the physician in selecting appropriate tests and treatment, and interpreting test results. However, these expert systems have not been integrated with the other aspects of the medical practice to enable the physician to monitor the outcome of patient treatment, in terms of either the cost or efficacy of medical treatment." Id. at 2, II. 3-12. Christopher seeks to address the problem of coordinating the information that would otherwise be contained in multiple, incompatible software programs and replacing them with a massively integrated, proprietary computer system for managing medical care of patients.

Christopher's approach requires that all of the information be recorded and maintained in Christopher's proprietary system. This requires entry and/or reentry of the information in response to screen prompts. There is no accommodation to integrate or accept data from the types of distributed applications that are otherwise used in a medical office, or to transfer information maintained in an office's legacy systems.

Microstrategy, Inc., of Vienna, Va., is the assignee of a series of patents for systems and methods for deriving information from a database system and outputting that information is a useful form through a personalized On-Line Analytical Processing (OLAP) system.

Yost, et al., U.S. Pat. No. 6,154,766, for System and Method for Automatic Transmission of Personalized OLAP Report Output (Nov. 28, 2000) describes a system for automatically generating data output on a scheduled basis in an on-line analytical processing (OLAP) system and broadcasting personalized reports to users based upon the data content selected. Yost describes an object creation module, communicating with a data warehouse and server, to gather the desired data on a scheduled basis and generate a personalized report to the user.

Yost, et al., U.S. Pat. No. 6,173,310 B1, for System and Method for Automatic Transmission of On-Line Analytical Processing System Report Output (Jan. 98, 2001) describes the server system used in his system for automatically generating data output on a scheduled basis in an on-line analytical processing (OLAP) system and broadcasting personalized reports to users based upon the data content selected. Yost describes a server system comprising: service creating means; service subscription means; service processing means; and output forwarding means.

Yost, et al., U.S. Pat. No. 6,260,050 B1, for System and Method of Adapting Automatic Output of Service Related Output of Service Related OLAP Reports to Disparate Output Devices (Jul. 10, 2001) describes a system for automatically generating data output on a scheduled basis in an on-line analytical processing (OLAP) system and broadcasting personalized reports to users based upon the data content selected. Yost describes a server comprising: service processing means; service subscription means; each user output device being associated with a device specific style that designates the format in which the user receives service output; output determination means; output formatting means; and output forwarding means.

Yost, et al., U.S. Pat. No. 6,269,393 B1 for System and Method for Automatic Transmission of Personalized OLAP Report Output (Jul. 31, 2001) describes a system for automatically generating data output on a scheduled basis in an on-line analytical processing (OLAP) system and broadcasting personalized reports to users based upon the data content selected. Yost describes a server comprising: service processing means; service subscription means; and output forwarding means.

Selvarajan, et al., U.S. Pat. No. 6,279,033 B1, for System and Method for Asynchronous Control of Report Generation Using a Network Interface (Aug. 21, 2001) enabling a user to asynchronously generate report requests through a web browser. The Microstrategy system automatically broadcasts, on a predetermined schedule, personalized messages to subscribers based upon criteria established by the subscribers. Other of Microstrategy's patents relate to adapting the system and method to an on-line environment.

None of the approaches disclosed in the above-referenced Microstrategy patents is directed to integrating data in a distributed application environment of a professional services practice, or enhancing or facilitating communication between the types of distributed applications that are typically used in a professional services practice.

Other approaches, however, have addressed the professional services market. For example, Whitmyer, U.S. Pat. No. 6,182,078 B1 for System for Delivering Professional Services Over the Internet (Jan. 30, 2001), and Whitmyer, U.S. Pat. No. 5,895,468 for System Automating Delivery of Professional Services (Apr. 20, 1999), are directed to a professional services setting and, in particular, a law practice.

Whitmyer, U.S. Pat. No. 5,895,468 for System Automating Delivery of Professional Services (Apr. 20, 1999) discloses a device for automatically delivering professional services directly to a client. Whitmyer describes a device including: a computer, a database of client reminders, and software for automatically querying the database of client reminders to select reminders. The software automatically selects and generates a form based on the client reminder and sends it to the client over the Internet.

Whitmyer, U.S. Pat. No. 6,049,801 for Web Site Providing Professional Services (Apr. 11, 2000), provides a web site that permits direct client entry of reminders into the central database of client reminders. Whitmyer's approach, however, enables corruption of the data in the docket by enabling potentially incorrect or unauthorized information to be added to the docketing database. Apart from integrating forms generation to facilitate automatic rendering of professional services, Whitmyer discloses no system or method for integrating or transferring data from the various applications software used in a professional services practice.

Whitmyer, U.S. Pat. No. 6,182,078 B1 for System for Delivering Professional Services Over the Internet (Jan. 30, 2001) discloses a system comprising: a computer; a database of client reminders; and software for automatically querying the database by values attributed to data fields to select reminders. The software automatically generates a form based on the retrieved reminder and transmits it to the client over the Internet.

Whitmyer, Patent Application Publication US2002/0029215 A1 for Web Site Automating Transfer of Intellectual Property (Published Mar. 7, 2002) discloses a system for automating the transfer of intellectual property. Whitmyer's system comprises: a central computer, a client computer, a communications link between them, and the Internet. The system includes at least one database comprising information records accessible by the central computer. Each record contains an intellectual property identification number. A database contains a plurality of intellectual property transfer documents accessible by the central computer. Software on the central computer receives a property transfer request, generates the necessary transfer documents, transmits the transfer documents, receives the executed transfer documents back, and transfers the executed transfer document to the appropriate Government recordation authorities.

Draper, U.S. Pat. No. 6,449,620 B1, Method and Apparatus for Generating Information Pages Using Semi-Structured Data Stored in a Structured Manner (Sep. 10, 2002) describes the pre-processing of semi-structured data to identify the data to be selectively retrieved by semi-structured queries. Draper's method comprises: providing a mapping between a structured schema and a semi-structured schema; receiving a semi-structured query; generating a structured query based upon the semi-structured query; and applying the structured query to structured data stored in accordance with the structured schema.

None of these proprietary applications, whether before or after the present invention, addresses the need to integrate and make more readily transferable the data used on a distributed basis in a professional services practice.

Case Management Applications

American Insurance Group (AIG), has implemented a Lotus Notes-based system for managing its outside counsel. In addition to maintaining basic identifying and background information about a matter, the system provided a vehicle for conducting correspondence between in-house and outside counsel about a particular matter. The source data is maintained in the Notes database with a dedicated, limited access messaging format for exchanging communications, authorization, and instructions about a case between outside counsel and the in-house case manager at AIG.

More recently, numerous case management software applications have been offered. Hummingbird, Ltd., offered a product under the brand name LawPack. Hummingbird acquired LawPack when it acquired PC Docs Group International, Inc., in June 1999. PC Docs sold the LawPack product for the in-house counsel market and its PC Docs document management product for outside counsel firms. The LawPack product did not fit within Hummingbird's core business strategy and Hummingbird announced in late 2001 that it was phasing out the LawPack product.

Other vendors who have offered case management applications include: eCounsel (Bridgeway Software Inc.); Legal Desktop (Corprasoft Inc.); Law manager (Elite Information Group, Inc.); TeamConnect (Mitratech, Inc.); ProLaw (Pro-Law—West Group); and Practice Manager (RealLegal, Inc.). Some of these products are also offered in web-enabled versions. The present inventor believes that each suffers at least some of the same drawbacks mentioned above of being either a proprietary, centralized approach that fails to accommodate the distributed, networked application environment in which most professional services practices operate, or requiring duplicitous entry of data into distributed, proprietary systems in which the data is not readily portable or substantially application-independent.

Web-Based Approaches

The Internet, generally, and World Wide Web in particular, has fostered the development of a series of protocols that enhance the transferability of data. New protocols, such as POP (post office protocol), HTML (Hypertext Markup Language), XML (eXtensible Markup Language), WAP (Wireless Application Protocol), SOAP (Simple Object Access Protocol), and others, allow a variety of devices and accessories (computers, hand held devices, and mobile phones) to "talk to" one another. Judge Jackson observed in his opinion in the Microsoft antitrust case, that the Internet "could oust the PC operating system from its position as a proprietary platform for applications development and the main interface between users and their computers." "The Future: Tomorrow's Internet," THE ECONOMIST, at 23 (Nov. 13, 1999).

HTML describes only the layout of a web page and does not describe its contents. Other protocols, such as XML (extensible Markup Language), also describe information content through the use of metatags. XML allows previously incompatible computer programs to communicate with one another to the extent of the information coded through metatags. Other approaches, such as Java, may also prove useful in facilitating the ready transfer of data. Although XML has won widespread support in recent years from Internet standard bodies such as the World Wide Web Consortium, it too has drawbacks, namely: astonishing complexity (Id. at 26) and the impracticality of metatagging the entire contents of a page. Standards are, nonetheless, emerging. Most of these are open standards.

Although XML is beginning to address the issue of transferability of data in the context of web search engines, it is a limited approach and has not been applied among the various software applications within a machine to enhance the transferability of data within an application or between applications. These standards have not found their way back into the PC or office network environment to help resolve the basic problem of transferring information between incompatible application software platforms within the same computing device or network. Nor have these approaches yet been applied to distributed networks serving professional services markets.

No solution yet emerged with respect to the security issues facing internal networks (authentication; authorization; confidentiality; integrity; and non-repudiation), let alone the Internet. Id. at 26. Encryption technologies have been suggested as a potential solution. Id. Yet, these too are saddled with the drawbacks of undue complexity and being proprietary and, therefore, less flexible and more rigid that desired. Id. Although PKI (Public Key Infrastructure) systems, employing digital certificates are also gaining ground, particularly in banking and telecommunications, they are similarly complex, rely on third party involvement, and are not well-adapted to use within an internal network to commoditize data between applications.

Open Architecture Applications

The "open architecture" movement regained momentum with the explosive growth of the Internet. The Open Source Movement has long required that access to its products, as well as any enhancements produced by using those products, remain freely available to all users. Operating systems, such Linux, feature open architecture. Open Source systems, such as Bind, Perl, Sendmail, and Apache have proven to be far more reliable than many proprietary software applications and operating systems. Microsoft itself recognized, in two internal memos, that the Open Source collective approach has been able to produce "higher-quality code than commercial software". Rivette and Kline, REMBRANDTS IN THE ATTIC, Harvard Business School Press (1999) at 190. This is due in large part to the substantial peer review each program has received. Id. at 189.

Although some software companies, such as IBM, Oracle, Netscape, Apple, Novel, Corel, and others, have opened portions of their software to Open Source developers, others have not done so at all and many have retained certain portions of their code as proprietary. Open Source systems could be useful in addressing the problems of transferability of data within an enterprise and/or to remote users and clients external to the enterprise's network. Its ability is limited, at present. This is primarily due to restraints on access and the lack of generally accepted standards for data formatting.

Long-Felt and Unresolved Need

After the filing of the Provisional Application upon which this application claims priority, PriceWaterhouseCoopers, Sears Roebuck and Co., and possibly others, have announced attempts to develop customized case management systems.

Prior to the present invention, none of the systems of which the present inventor is aware facilitated the ready transfer of data between the various distributed applications used in a professional services practice. None provided data in a substantially application-independent or pqrtable fashion. Moreover, none of the prior known approaches have resolved the unmet need to facilitate the transfer of data between outside professional service providers and their clients. Thus, there remains a long-felt and unmet need for a simple, efficient, and effective means for enabling data to be transferred between various software applications and computers in an internal and/or external network and, in particular, in the setting of a professional services practice.

OBJECTS OF THE INVENTION

It is, therefore, an object of a preferred embodiment of the present invention is to manage data used in a professional services practice in a substantially application-independent, or at least substantially portable, fashion.

An additional object of a preferred embodiment of the present invention is to enhance the transferability and/or portability of data between or among various distributed applications of the types that are used in a professional services practice.

Another object of a preferred embodiment of the present invention is to provide a method for managing data used in a business and, in particular, in a professional services practice.

Yet another object of a preferred embodiment of the present invention is to provide a system for facilitating the transfer of data among various distributed software applications used in a law practice.

A further object of a preferred embodiment of the present invention is to aggregate and/or integrate data used to manage professional services projects.

Additional objects and advantages of the invention are set forth, in part, in the description which follows and, in part, will be obvious from the description or may be learned by practice of the invention. The objects and advantages of the invention will be realized in detail by means of the instrumentalities and combinations particularly pointed out in the appended claims.

BRIEF SUMMARY OF THE INVENTION

As illustrated in the accompanying diagrams and described in the accompanying claims, the invention is a method and system for improving the accessibility and transferability of various data and/or information resources used in the management of a business and, in particular, a professional services practice. The present invention may be practiced in various embodiments, some of which are described in detail below. The following summary and detailed descriptions of various embodiments of the invention are illustrative and explanatory only, and should not be construed to limit the invention as claimed in the appended claims and their equivalents.

In a preferred embodiment, the present invention comprises: Client Means; Matter Means; Project Means; Event Means; Task Means; and if desired, Document Means, Budgeting Means, Project Management Means, Assessment Means; and various alternative enhancements. In certain embodiments, Client Means, Project Means, and/or Activity Means may be provided. Alternatively, the present invention preferably comprises: Client; Matter; and Event Means. The invention may further comprise related information, data; and/or analysis, such as: communications; documents; forms; budget and/or cost information; project management; risk management; and other applications or information. The system of the present invention may be adapted to cooperate with other shared or linked data sources.

The present invention may be embodied in various forms, including, without limitation: data, software applications, network, data processing system, method, and various alternative forms. In a preferred embodiment, the invention comprises data relating to a professional services project, in machine readable format other than a proprietary format. The data of the present invention may be in a format that is other than exclusively proprietary, other than proprietary, or other than substantially proprietary. Further, the data may be in a format that is: substantially portable; portable; substantially application-independent; or application-independent. The data may be: docketing; calendaring; word processing; document management; accounting; time and billing; or any other data of a type used in a professional services practice.

Alternatively, the invention may be embodied in a software application, for use in conjunction with a professional services project, the data cooperating with data storage means, the data being in machine readable format, comprising data in substantially portable format.

In another alternative embodiment, the invention comprises: a data processing system for managing data related to a professional services project, comprising: computer for processing the data; a software application cooperating with said computer; and data storage means cooperating with said computer for storing data; the data cooperating with said software application; the data in a substantially portable format.

In a further embodiment, the invention comprises a project management system for a professional services project, comprising: computer network means; data processing means cooperating with said network; one or more distributed application means, cooperating with said data processing means; data storage means, cooperating with said one or more distributed application means, for storing data; said data being substantially portable between said one or more distributed applications. Alternatively, the invention comprises: a computer network for managing a professional services practice, comprising: a computer network; data processing means; one or more distributed application means; data cooperating with said one or more distributed application means; data storage means for storing said data from said one or more distributed application means; and project management database means cooperating with said one or more distributed application means for facilitating the communication of said data from said one or more distributed application means.

In yet another embodiment, the invention comprises an improvement on a computer network for managing a professional services practice, comprising a computer network, data processing means, one or more distributed application means, data cooperating with said one or more distributed application means, and data storage means for storing said data from said one or more distributed application means, the improvement comprising: project management database means cooperating with said one or more distributed application means for facilitating the transfer of said data from said one or more distributed application means. Alternatively, the improvement may comprise, in a computer network for managing a professional services practice, comprising a computer network, data processing means, one or more distributed application means, data cooperating with said one or more distributed application means, and data storage means for storing said data from said one or more distributed application means, the improvement comprising: a case management data base; said case management database communicating with said one or more application means; said case management database means being adapted to receive data from said one or more application means; said data being substantially portable data.

Alternatively, the invention may be embodied in a user interface for a computer network used in a professional services practice, comprising: first substantially distributed application; second substantially distributed application; said first distributed application being adapted to communicate with said second distributed application; data storage means cooperating with one or more of said first or second distributed applications for storing data used in the professional services practice; a user interface capable of accessing said data; and said user interface adapted to cooperate with one or more of said first or second distributed application means and said data storage means. In another embodiment, a user interface may further comprise: client means; matter means; and project means. In a further embodiment, the user interface may comprise: an user interface for computer network for use in a professional services practice, comprising: one or more distributed applications; case management database adapted to communicate with said one or more distributed application means; data storage means cooperating with case management database means; and the user interface cooperating with one or more of said data storage means and said one or more distributed application means.

In yet another embodiment, the present invention may be an application for managing a professional services practice, comprising: one or more proprietary application means; data storage means adapted to cooperate with said one or more application means for storing data relating to the professional services practice; shareware application means; said shareware means cooperating with one or more of said one or more application means and said data storage means to render the data portable.

In another alternative embodiment, the invention may comprise a data processing system for managing data relating to a professional services project and providing pertinent data to a user, comprising: network means; one or more proprietary, distributed application means; server means for distributing said one or more proprietary, distributed application means to the user on said network; data storage means for storing said data, said data storage means being adapted to cooperate with one or more of said server and said one or more distributed application means; first data integration means, cooperating with one or more of said server, said one or more distributed application means, and said data storage means, for transferring said data; storing said data in a format other than a substantially proprietary format; and providing said data to a user.

In yet another alternative embodiment, the invention is a method for use in a data processing network for a professional services practice comprising one or more proprietary software applications, the method comprising: accessing a proprietary application; storing data used in conjunction with said proprietary application; case management means, being in a format other than the format of the proprietary application, securing from the proprietary application on an automated basis, without human intervention, said stored data used in conjunction with said proprietary application; the case management means storing the data in a format other than the format of the proprietary application; accessing case management means; accessing said data stored in said case management means; making said data, in format other than the proprietary format, available to a user.

In additional alternative embodiments, the present invention may be embodied in a shareware application, or in further alternative embodiments, in a quality control system and financial reporting system for a professional services practice.

It is to be understood that both the foregoing general description and the following detailed description are exemplary and explanatory only, and are not restrictive of the invention as claimed. The accompanying drawings, which are incorporated herein by reference and constitute a part of the specification, and in which like numerals are used to refer to like elements, illustrate certain embodiments of the invention, and together with the detailed description, serve to explain the principles of the present invention.

DETAILED DESCRIPTION OF PREFERRED EMBODIMENTS

Figure 1:
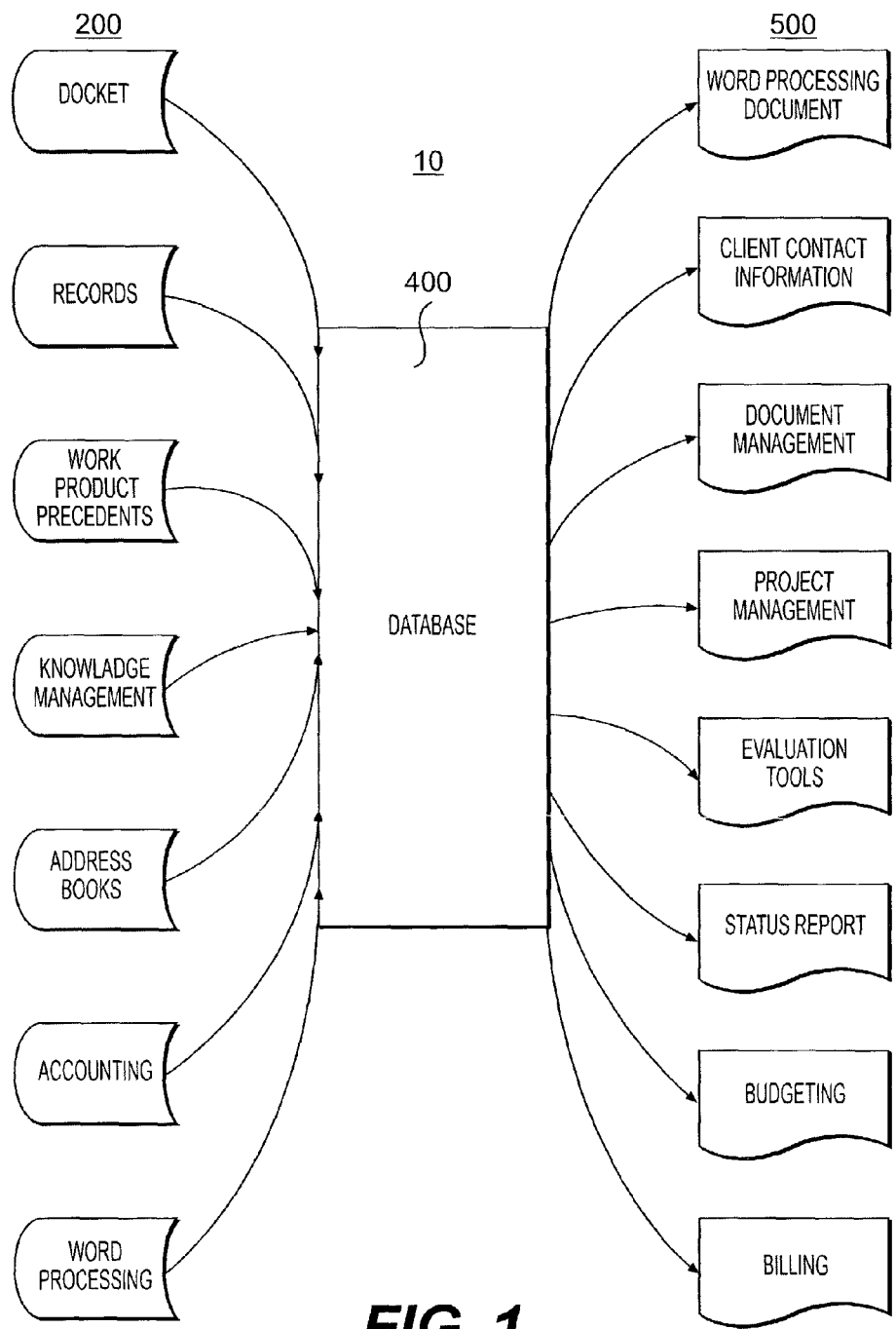
FIG. 1 is a flowchart depicting the interrelationship of various information resources and applications that may be used in conjunction with the database of a preferred embodiment of the present invention.
Figure 4:
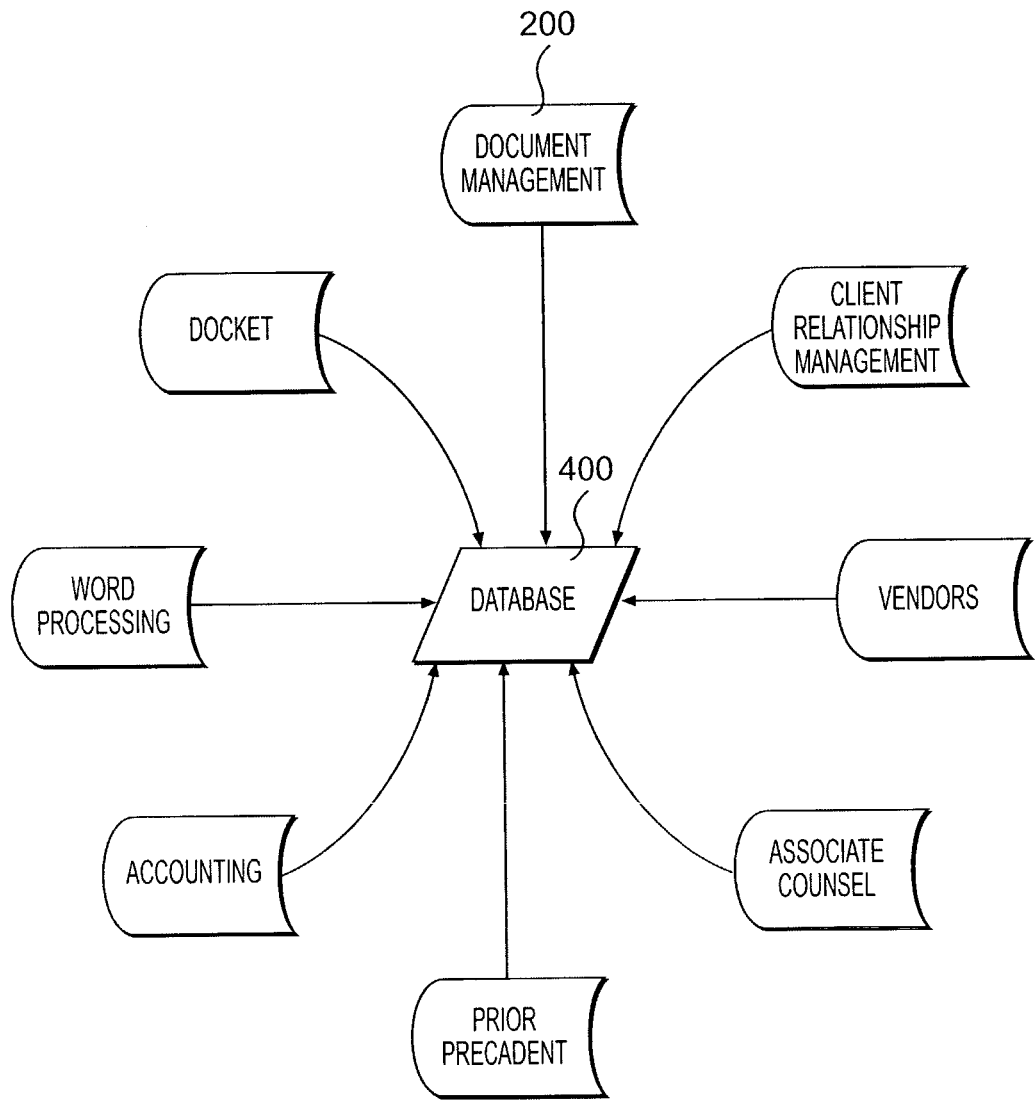
FIG. 4 is a necklace diagram, depicting the flow of data from various data sources to a database of a preferred embodiment of the present invention.

Reference will now be made in detail to alternative preferred embodiments of the method and system of the present invention, examples of which are illustrated in the accompanying drawings. A preferred embodiment of the present invention, in the setting of a law practice, is shown in FIGS. 1 and 4 as 10. In a preferred embodiment, the present invention comprises a method and system for aggregating and/or transferring data useful in the management of a professional services project or engagement. The present invention preferably provides a substantially portable or application-independent format for data used in a professional services practice.

The method and system of the present invention is illustrated in the setting of a law practice. It is intended, however, that the invention has wider applicability to other forms of professional services, such as medical practices, accounting practices, consulting services, and other professional services practices, as well as other business applications. The following detailed descriptions of various preferred embodiments, and examples of the invention, are illustrative and explanatory only and should not be construed to limit the present invention as disclosed and claimed.

Various programming and database development techniques are well-known in the art. Applicant expressly intends that these, as well as protocols, standards, and techniques yet to be developed, be considered within the scope of the present invention. For example, Michael Blaha discusses various techniques that would be known to persons of ordinary skill in the art at the time of filing the priority document for the present application, in "A MANAGER'S GUIDE TO DATABASE TECHNOLOGY" (Prentice Hall 2001), which is incorporated herein by reference, in its entirety, as if fully set forth herein.

"Proprietary," "Common," "Portable," and "Application-independent" Formats

For purposes of the present application, Applicant distinguishes between "proprietary" formats on one hand, and "common," "portable," or "application-independent" formats on the other. In principle, databases should be application-independent. In practice, however, databases are built for a specific application. Michael Blaha, "A MANAGER'S GUIDE TO DATABASE MANAGEMENT" (Prentice Hall 2001) at 3. Professional services practices rely on a variety of proprietary applications. Many are legacy systems in proprietary formats. Consequently, the data used in a typical professional services practice is substantially application-dependent. The data is not readily transferable or portable among applications.

As used in the present application, the terms "common," "portable," and "application-independent" are intended to convey a sense of the relative transferability of the data, and not an absolute or particular degree of transferability or application-independence. These terms are not intended to imply that the data is perfectly application-independent or completely fungible between software applications and/or operating systems, without error, modification, or adaptation. "Portable" formats preferably include standard such as ODBC: protocols and/or standards, either that are in existence today or that will be developed in the future. Application-independent formats include, without limitation, relational databases; SQL databases; and XML and HTML standards and protocols. Application-independent formats may also include various other web-enabled applications and protocols; SOAP; WAP; Open Source applications; Lotus Enterprise Integration; ZMerge; or other applications that are adapted to permit, facilitate, or enhance the transferability of data between applications.

The term "proprietary," in conjunction with data formats of the present invention, refers primarily to proprietary software applications, of the types that are typically used in a law or other professional services practice. These may include, by way of example and not limitation, legacy systems and various hierarchical databases. The use of the term "proprietary" includes but is not limited to data that is entirely application-dependant or exclusive to a single application. Nor is it intended to convey an absolute sense of incompatibility or exclusivity. Rather, the term "proprietary" is intended to convey a relative degree of difficulty of transfer of data. For example, the relative degree of difficulty of transferring data from and/or among the various docketing and/or accounting applications of the type that were known in the legal market prior to the present invention is considered "proprietary." Docketing systems (such as CPI, Dennemeyer, Master Data, Pattsy, or IPPO in an intellectual property practice), and accounting systems (such as Broadway, TMC, and/or Elite), prior to the present invention, had limited ability to transfer data to other applications used in the enterprise, such as word processing systems (such as WordPerfect and Word), document assembly systems, spreadsheets (such as Quarter, Excel, and Lotus 123), project management systems, and other software applications.

Although Microsoft and Corel each represented, prior to the present invention, that documents could be transferred readily between their respective word processing programs (Word and WordPerfect), errors and critical failures occurred frequently. Legacy knowledge bases in a prior version of a software platform are frequently lost upon conversion or upgrade, requiring costly and time-consuming efforts to convert individual documents and/or data to the newer release format. Although it may be possible to transfer data between these various "proprietary" applications, substantial effort is required to convert or transfer the data. These applications are not specifically designed to render the data readily transferable between them.

The term "proprietary" may be understood in some other settings to convey some claim of exclusive ownership, such as rights accorded by patent, trademark, copyright, or trade secret protection. The term "proprietary" as used in this application, however, is not limited to that sense of exclusive ownership rights but, rather, is used in the sense of the relative degree of application-dependence of the data. Formats that may enable a high degree of transferability and accessibility (such as .pdf, .tif, .jpg, and a wide variety of other data formats and protocols that are known in the art or may later be developed) may be "proprietary" in the sense that they are subject to claims of exclusive rights but should be considered to be "portable" in terms of data transfer and aggregation for purposes of the present invention. Similarly, proprietary applications may use relational or SQL databases, XML or HTML coding, and be considered application-independent in the sense of the present invention. Similarly, some "open source" software operating systems and/or applications may be public domain information in terms of ownership rights but may lack the requisite degree of data transferability.

Applicant considers application-independent data formats to be a preferred embodiment of the present invention. Nonetheless, the present invention may be implemented with "application-independent" or "portable" data formats, "proprietary" data formats, or some combination of them. Although the use of application-independent formats, such as relational databases, SQL databases, XML and HTML are within the level of ordinary skill in the art, these techniques have not been applied for purposes of the present invention, particularly in a professional services setting. In view of the lack of consensus standards, the invention is implemented in a Lotus Notes database in a present preferred embodiment. In certain preferred embodiments, a Lotus Notes database (which is ODBC-compliant), and/or SQL database, queries otherwise "proprietary" databases (such as a "proprietary" docketing, accounting, word processing, time and billing, etc., system). An Appendix is provided of the Forms implemented in connection with one embodiment of the invention in a Lotus Notes database format.

Standards and Protocols

Applicant expressly intends that the invention include various improvements in protocols and/or standards for data transfer that may occur or be developed after the present invention. The preferred implementation of the present invention incorporates generally accepted protocols that are accepted throughout the market for professional services in which they are used. These to-be-developed protocols or standards may include developments in open source software, data standards, data transfer protocols, and/or web-enabling technologies, or other technologies. The present invention is expressly intended to cover such improvements and developments that may enhance the transferability, portability, or application-independence of data and/or the ability to aggregate data between or integrate various distributed, proprietary applications.

System of the Invention

The system of a preferred embodiment of the present invention comprises: a digital computer 300; one or more databases 200; and means for providing data 100 to a user in substantially application-independent or "common" data format 400. As shown in FIGS. 1, 2, 4, 5, and 9, network 10 comprises multiple applications 500. Data 100 is stored in one or more data storage means 200 of native applications and, ultimately, supplied to one or more applications 500. This can be accomplished either through an intermediary database means 400, a server system 300, and/or a combination of a database 400 and server 300, that secures the desired data 100 from the respective databases 200 and supplies it to database 400 and then to applications 500, or directly to applications 500.

A typical law firm maintains a computer network hosting multiple distributed software applications used in the practice. These applications typically store the data 100 used by the applications 200 in proprietary or substantially application-dependent formats. FIGS. 1, 2, 4, 9, 12, and 13, depict some of the various distributed software applications used in a typical law office environment:

Accounting—Time entries are typically key entered by secretarial staff and/or timekeepers. Expenses are also typically key entered into the firm's cost recovery systems (photocopies, faxes, postage, and various ancillary services) or may be captured by automated cost recovery components. Other charges are posted to the firm's accounts payable system based on submission of documentation that has been authorized by the appropriate supervisor. These accounting data are then compiled and used to track the cost of the project, compare cost versus budgeted amounts, and prepare invoices to-clients. In a law firm setting, these accounting records are typically maintained in a proprietary format (such as those offered by Elite, TMC, Broadway, or another vendor).

Docketing—Docket entries are typically key entered by a docketing clerk or department, based upon physical documentation received about events relating to a project. Docketing may also be accomplished by scanning bar-coded or other documentation. Alternatively, data may be downloaded from the PTO, EPO, or other Governmental website. Docketing is typically carried out in a proprietary system (such as, for example, CPI, Master Data, Dennemeyer, Pattsy, IPPO, and others for patent and trademark application services). These applications have been highly constrained with respect to the formatting of the data. In general, docketing data is not readily transferable from docketing systems to other applications, among docketing systems from different vendors, or between non-sequential (and in some cases, even sequential) versions of the same vendor's docketing system. Typically, when a user converts from one vendor's system to another's, or even between sequential versions of the same vendor's software, substantial conversion effort and expense is required.

Some vendors of docketing systems are now offering web-enabled versions of their software. Even these web-enabled versions, however, are limited with respect to the formats in which they can transfer and/or report pertinent information about a project. Prior known web-enabled docketing systems report only that data maintained in the docketing system and are not adapted to cooperate with other sources of data in the manner of the present invention. Moreover, clients using multiple outside counsels would be required to visit multiple firms' web sites to gather the requisite information about their projects.

Word Processing/Document Management—With respect to law firms in particular, two word processing systems enjoyed widespread usage prior to the present invention: Microsoft Word; and Corel WordPerfect. In view of the acquisition of WordPerfect by Microsoft from Corel, the release of Windows XP in the Fall of 2001, and the failure of WordPerfect to maintain its word processing software for the legal market, Microsoft Word has gained ascendancy, at least among law firms in private practice.

Microsoft Word, in particular, has substantial limitations with respect to data transferability. Although Microsoft has long advertised the transferability of documents between WordPerfect and Word, Microsoft Word generally fails effectively to convert WordPerfect documents in practice. WordXP is not capable of reading many documents that were generated in either WordPerfect or prior versions of Word, requiring a labor-intensive manual process to convert the document to WordXP.

Figure 3:
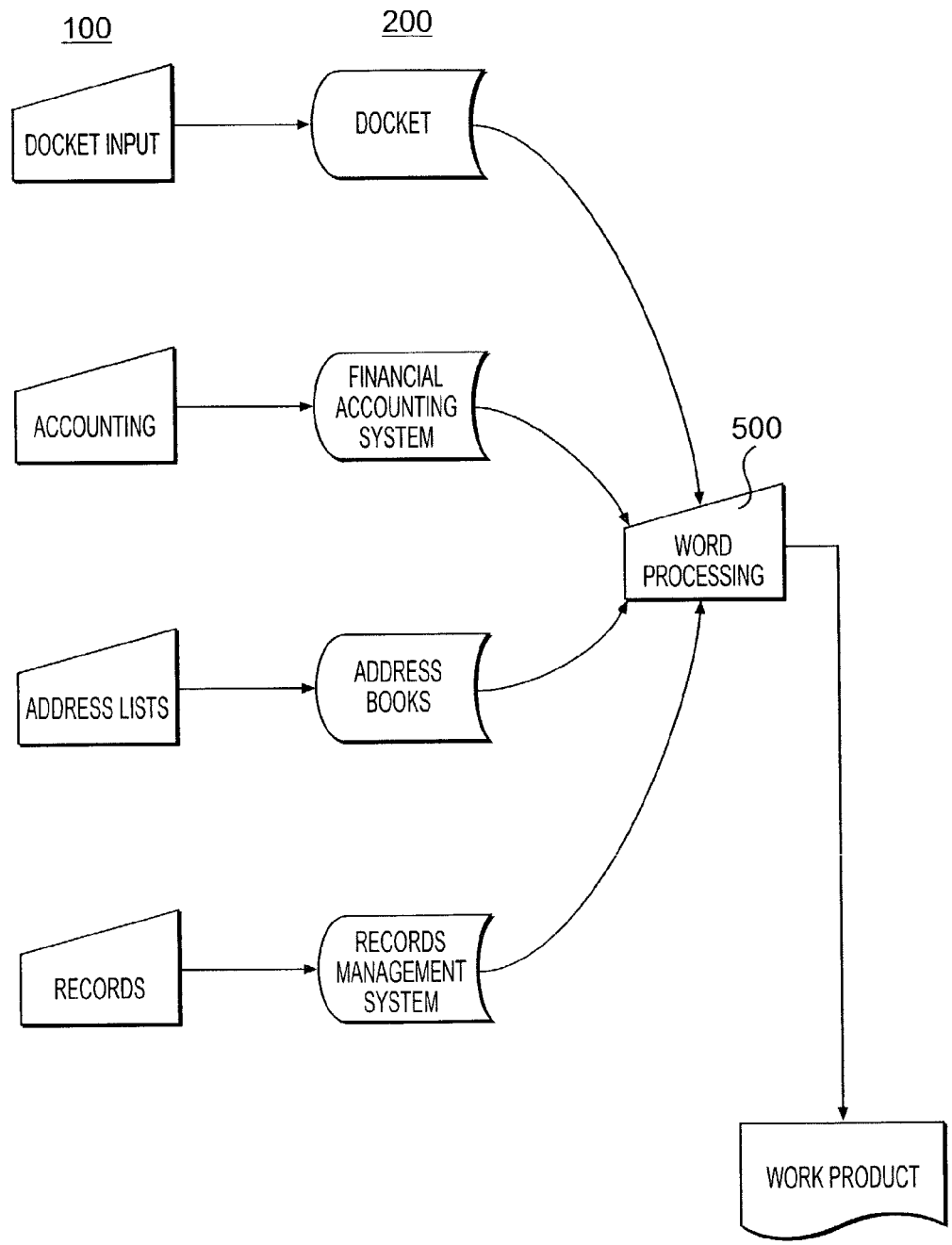
FIG. 3 is a flowchart illustrating the flow of various types of data into a single application in a legal practice, in a manner known prior to the present invention, illustrating the potential conflicts between multiple data sources for address information being supplied to the application, in this example, a word processing application.

Addresses—As depicted in FIG. 3, address information is gathered and maintained in various databases in a typical law office: docketing systems; accounting records; the firm's document management system; and attorneys' and staff members' individual address books. Data may also be received in the form of email records and hand-held databases, or relationship management databases. These records may be maintained in address software sold by Rolodex, Notes, iEnterprises, or numerous other vendors. Certain of these data formats, however, are incompatible with other formats.

Document Assembly or "Forms" systems, maintained in a firm's word processing or docketing system or as a separate application (such IPDAS), typically use the same address information. With multiple sources of address information, however, it is often unclear which records are up to date and which are not valid. Depending on the network configuration, access to certain sources of the information may be slowed or impaired. Moreover, multiple sources for the same information invites errors in data entry, retrieval, and maintenance.

Knowledge Base—Firms generally employ a variety of resources to maintain knowledge bases of information. For example, specialized legal resource materials, treatises, case digests, statutes, regulations, forms, prior work product precedents, and a wide variety of other materials typically are maintained in the firm's knowledge management and/or document management systems. Attorneys may subscribe to various web-enabled services or reference forms and precedents over the web. Precedents may also be accessed as email attachments. In recent years, the market for support services has expanded substantially and now includes legal research services provided by third party vendors. These vendors may also supply data used by the firm, either through electronic communications such as email or in a web-enabled fashion.

It has become common practice to employ the firm's document management system to index work product precedent, in lieu of a separate knowledge management system. This approach, however, is heavily dependent on the quality of abstracting in the firm's document management system because full text searching through the entire document management system is often not practicable. Many of these document and knowledge management databases are maintained in a variety of inconsistent and/or incompatible formats, necessitating access to multiple software applications.

Records—Firms also maintain records of communications, correspondence, legal and fact research, and official communications received in conjunction with a representation. These records may be maintained in hard copy, in electronic form, or more typically in some combination of the two.

Thus, prior to the present invention, the attorney would have to access multiple native applications, employing widely divergent formats, in order to access the data necessary effectively to manage a client's projects.

Figure 9:
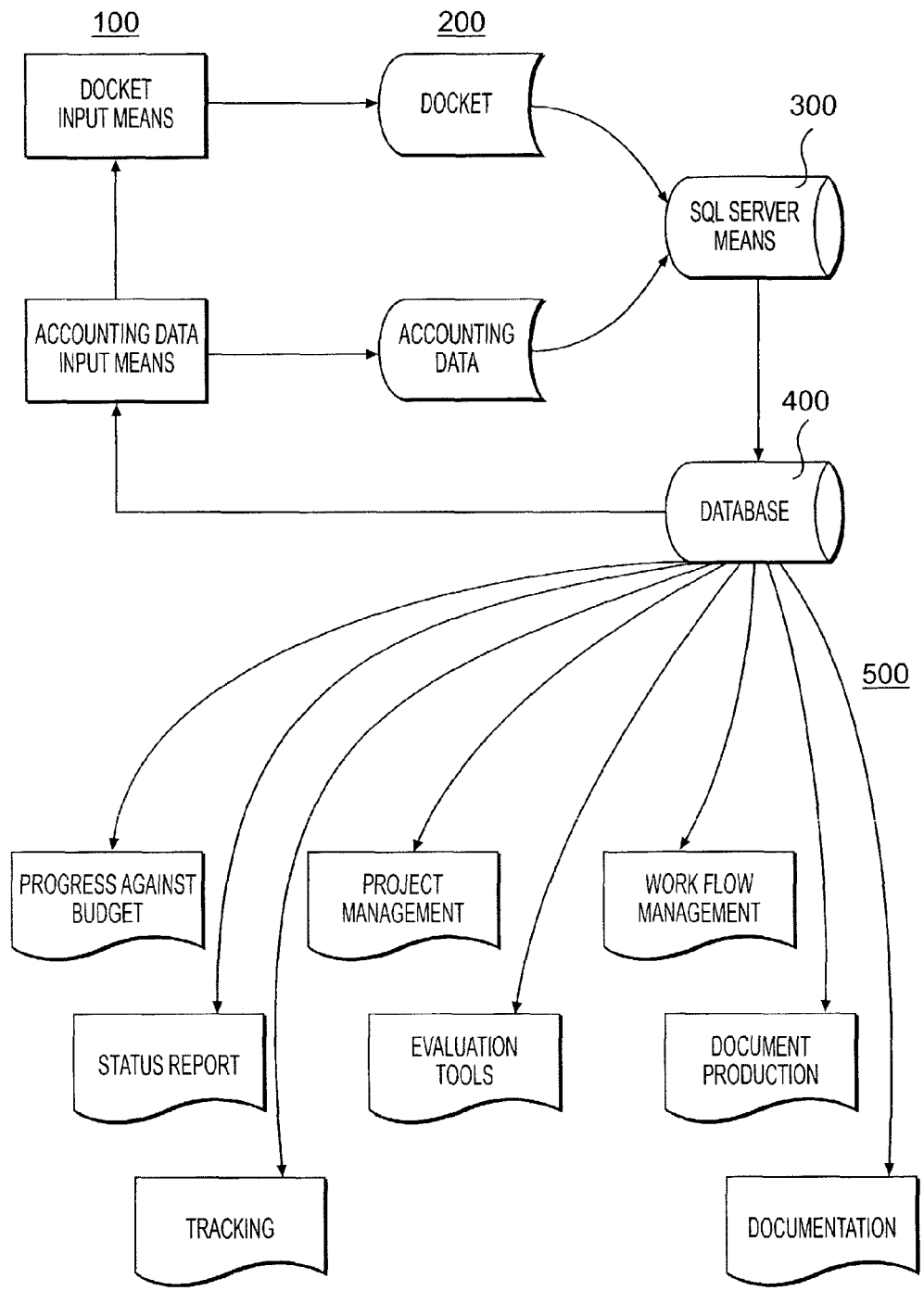
FIG. 9 is a flowchart depicting an alternative preferred embodiment of the present invention, employing SQL server means to transfer data between the data sources and a database of a preferred embodiment of the present invention, showing the flow of data between various data resources and applications used to manage a legal practice.
Figure 10:
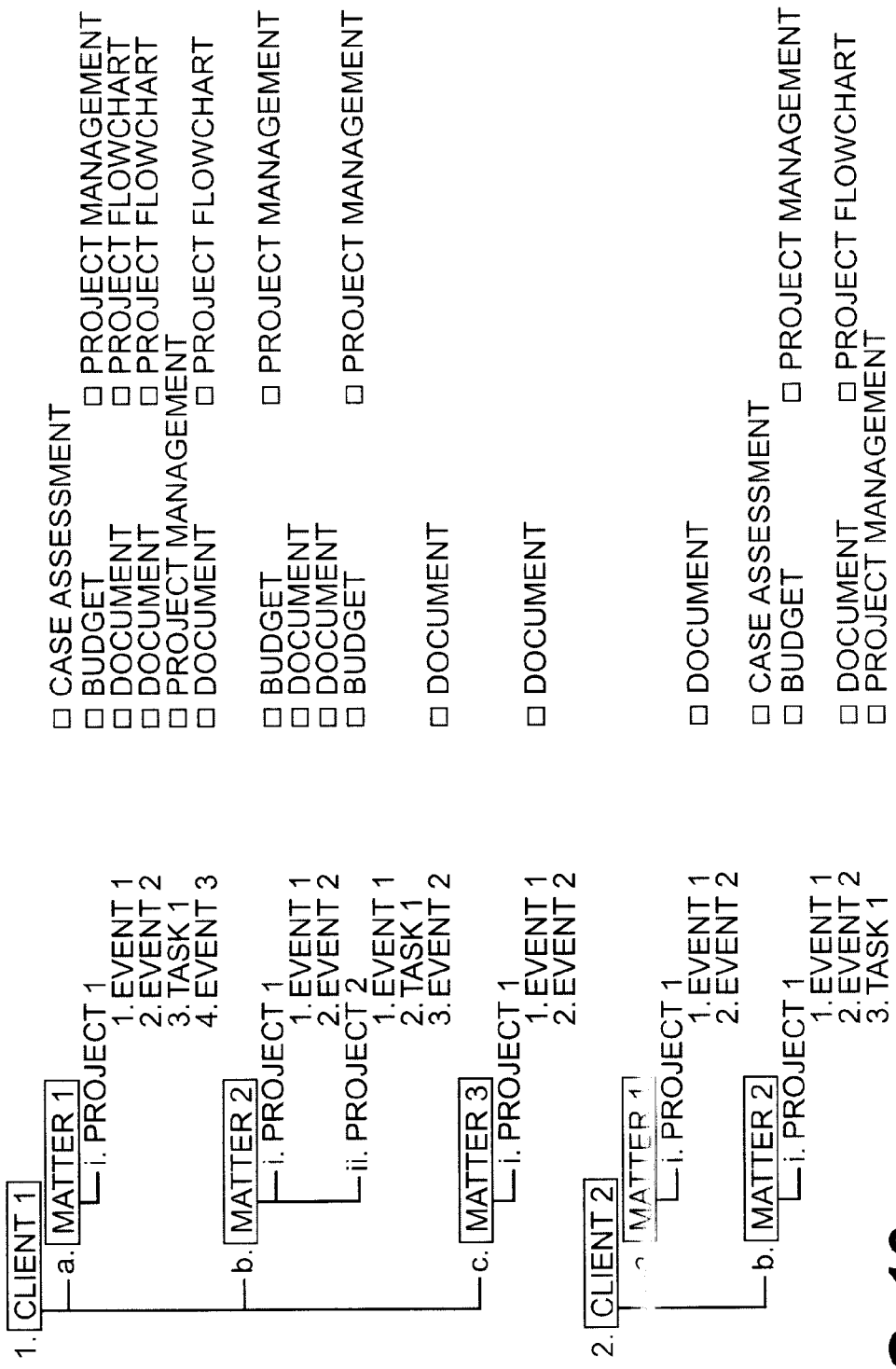
FIG. 10 is an outline depicting the hierarchy of data of a preferred embodiment of an information management system of the present invention implemented through a Lotus Notes database.
Figure 11:
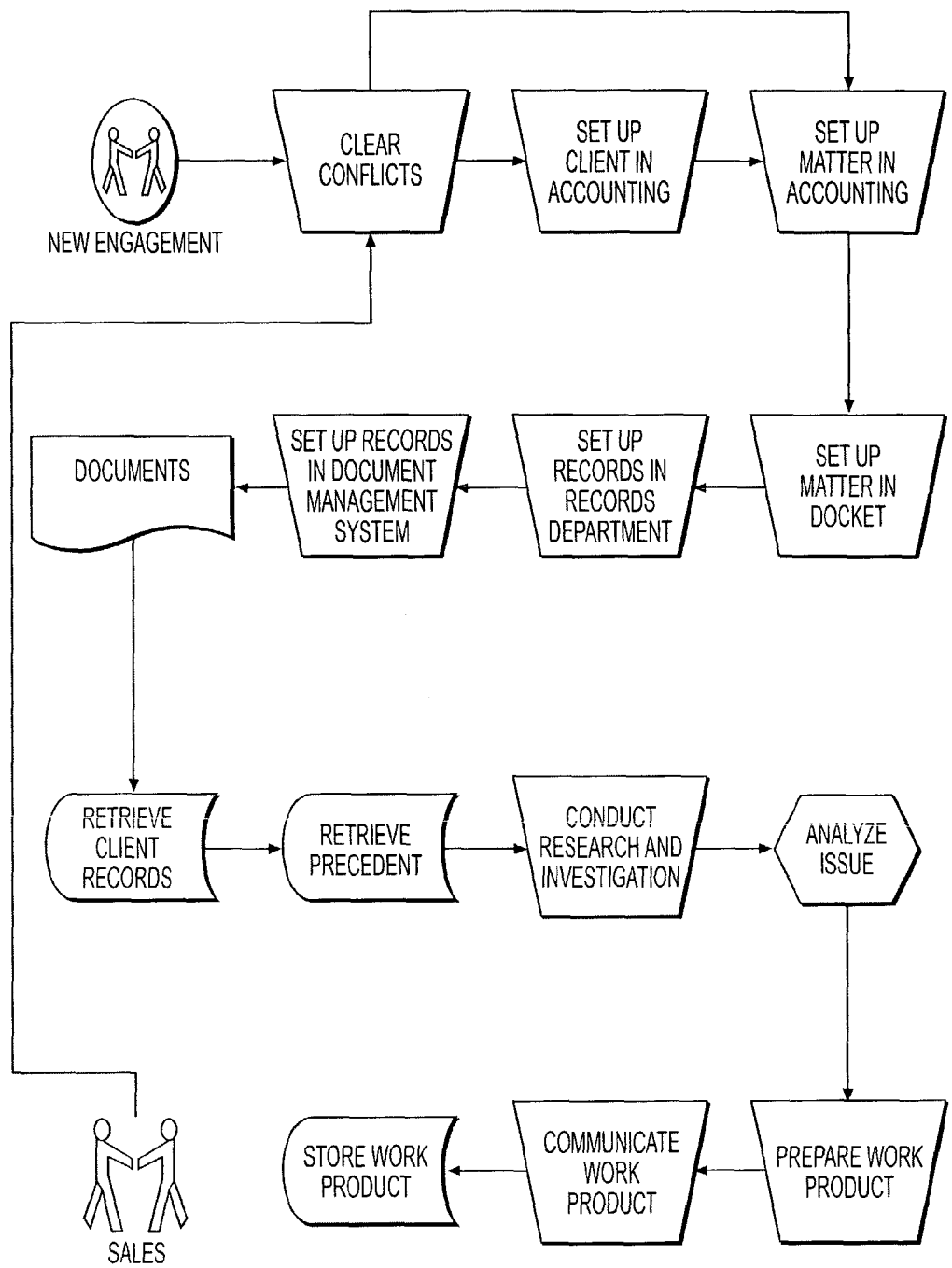
FIG. 11 is a flowchart depicting some of the steps encountered in the course of a professional services representation.
Figure 12:
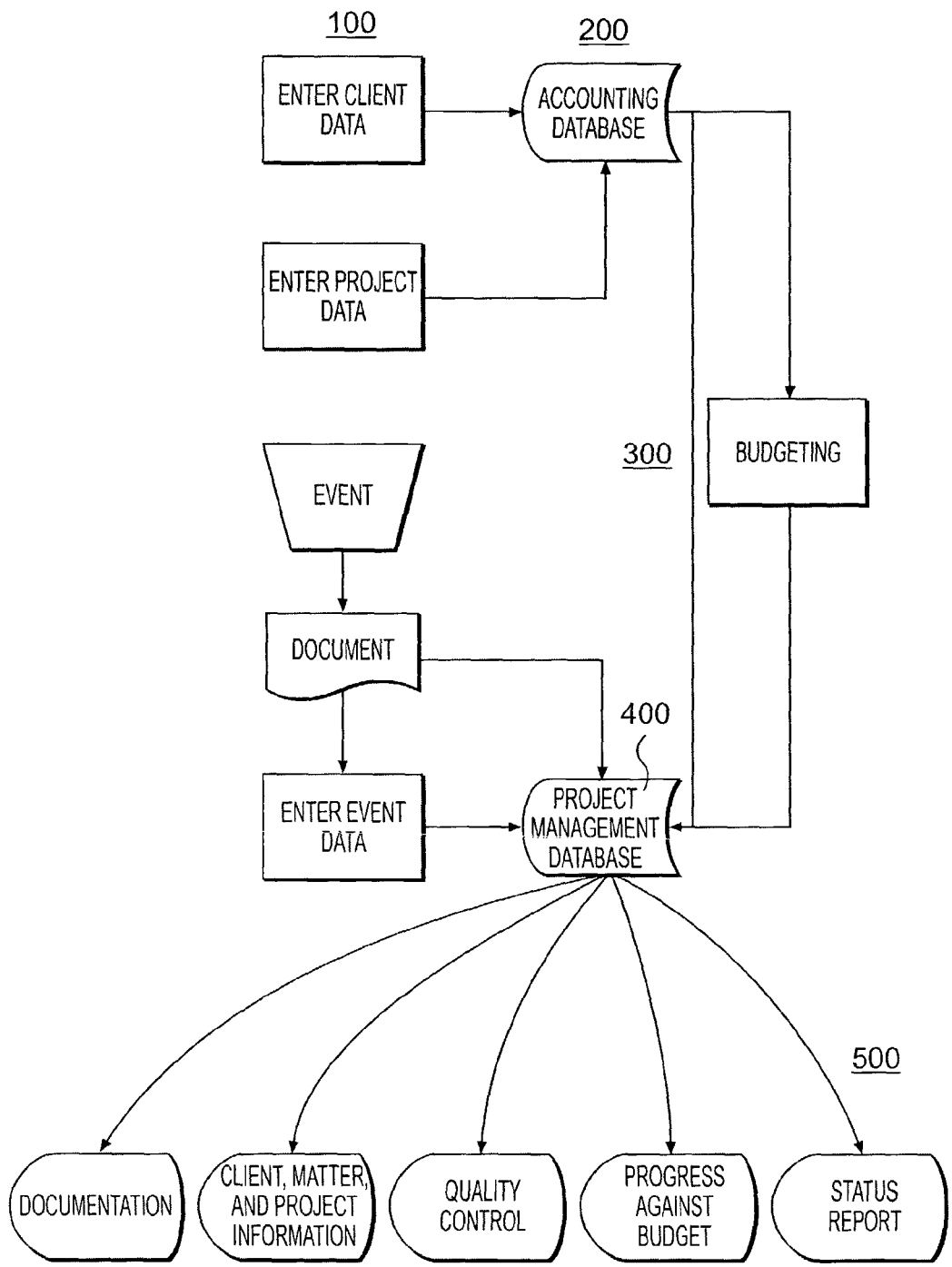
FIG. 12 is a flowchart depicting a data structure and method of an alternative preferred embodiment of the present invention.
Figure 13:
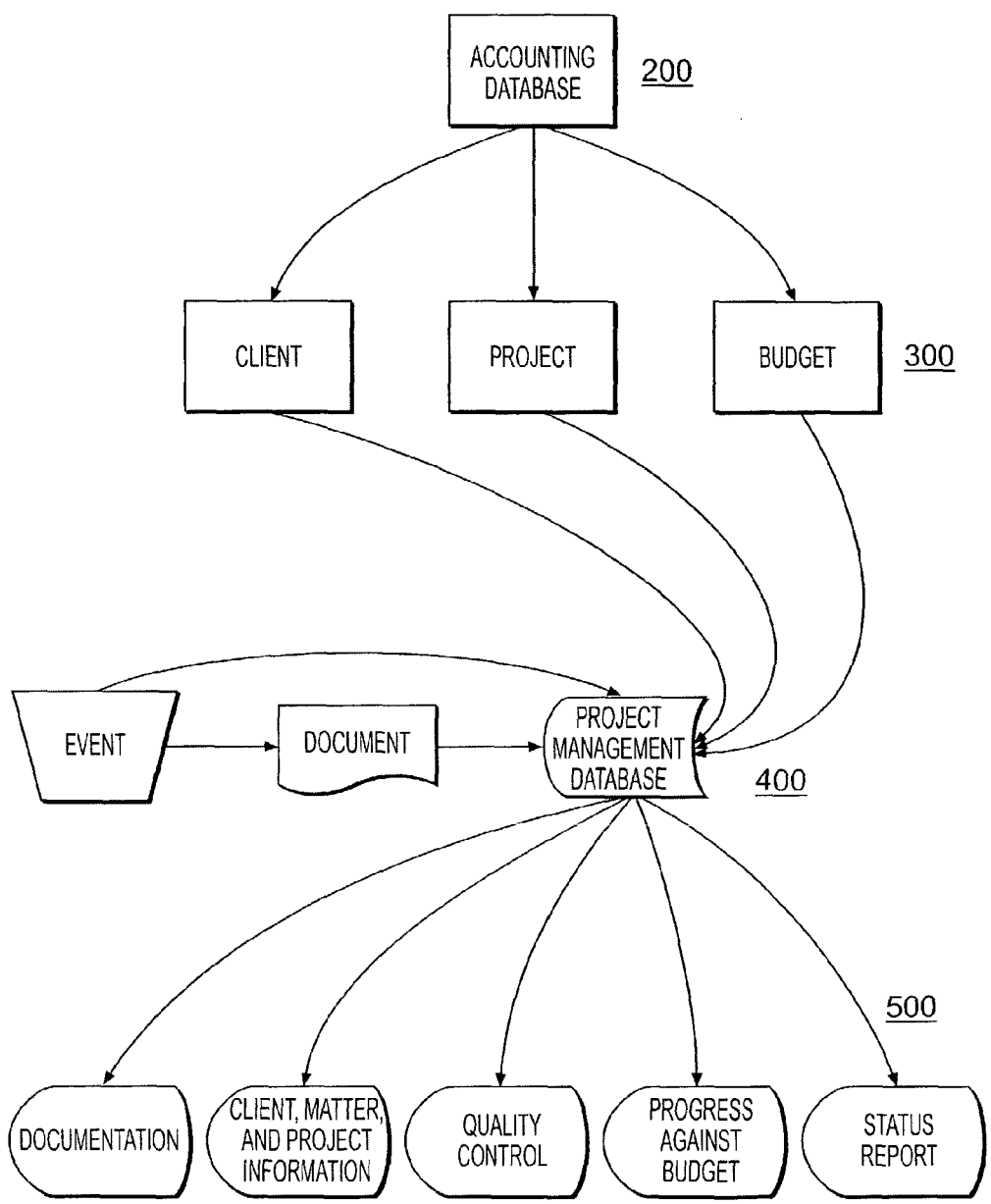
FIG. 13 is a flowchart depicting a data structure and method of an alternative preferred embodiment of the present invention.

In an alternative embodiment of the present invention, as shown in FIG. 1, data 100 is transferred directly from the native applications 200 in which it is normally stored directly to a Notes database 400 in substantially application-independent format. Alternatively, as shown in FIG. 9, SQL server 300 periodically queries native applications 200 and secures data 100 from native applications 200 and transfers it to Notes database 400 from which it can be read or transferred to applications 500, or from which it can be transferred directly to the end user applications 500, in either "common" or "proprietary" format, without an intermediate substantially application-independent database or data warehouse.

Figure 2:
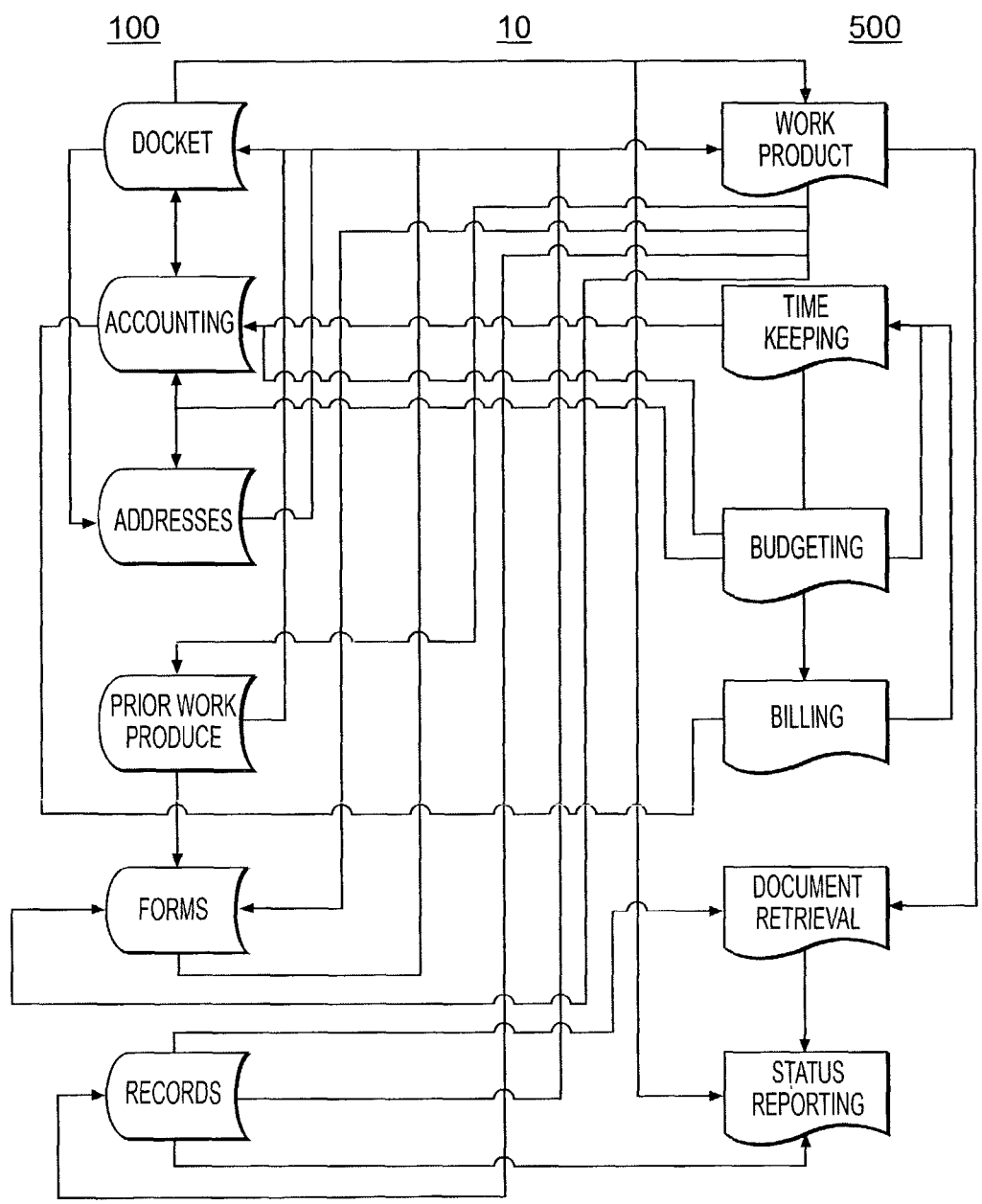
FIG. 2 is a flowchart depicting the flow of data and information between several of the data sources and applications in an alternative preferred embodiment of the present invention.

Data means 100 comprises data used in the business or professional services practice. Data means 100 preferably further comprises data in a substantially "portable" or application-independent format. Common data formats may include open formats, any of various ODBC-compliant formats, relational databases, SQL databases, various web-enabled formats (such as ip, tcp/ip, ftp, http, HTML, XML, and other web-enabled formats), and any other suitable common data format that is adapted to support transfer of the data. In a preferred embodiment, data means 100 are maintained in a common data format, in which it can be transferred among the various native applications, as shown in FIG. 2. Data means 100 preferably further comprises methods, processes, or systems, for securing the data, such as key entry, voice recognition, optical scanning and/or imaging, data transfer, reading data from any medium, or any other suitable techniques.

In a preferred embodiment, data means 100 comprises: client means, matter means, and event means. In alternative preferred embodiments, data means 100 further comprises any one or more of the following: project means; task means; documentation means; budget means; expense means, project management means; project evaluation means; and other data. Illustrative Forms for each type of entry are provided in the accompanying Appendix.

Client Means

Client means preferably comprise data about the client for whom the project is being performed. Client data means typically are maintained in a docketing and/or accounting system. The client is established as a client of the firm, after conflicts have been cleared with respect to the representation. The data may be key entered into the accounting system and preferably transferred to the docketing system and other software applications in which the data is needed, such as word processing and/or address books, or vice versa. Prior to the present invention, the data was typically key-entered separately into each application (conflicts, accounting, docketing, word processing, time and billing, etc.) in which it was needed.

In an alternative preferred embodiment of the present invention, Client means further comprises one of more of the following: Bibliographic Information; and Service Provider Information. Bibliographic information preferably comprises one or more of the following: Client Name; Client Number; Primary and Supplemental Contact Name(s) and Address(es); Client's Line of Business; Client's Products/Services; and/or any other pertinent information. In an alternative preferred embodiment, Service Provider Information further comprises Attorney Information. The Attorney Information preferably comprises one or more of the following: Referral Information; Originating Attorney; Billing (or Client Relationship) Attorney; Supervising Attorney; Working Attorney(s); Billing Arrangement; Billing Rates; Alternative Fee arrangements (if any); and any other client of the firm to whom the client is related.

Matter Means

Matter means comprises data about the matter for the client for whom the project is being performed. Matter data means typically are established in the same fashion as client means. Address information is typically linked to a client and/or matter. Thus, while the project is proceeding, client means, and/or matter means are preferably available and client data means, address data means, and matter data means, are coordinated between accounting, docketing, address, and other applications in which the data is needed.

Matter Means preferably further comprises one or more matters adapted to the professional services being rendered by the professional services firm to the client. For example, in the setting of an intellectual property law practice, matter means may comprise any one or more of the following types of matters: Patent; Trademark; General Counseling and Advice; Administrative Proceedings; Litigation; Licensing and Agreements; and matters for specific third parties.

Matter means tracked by the present invention preferably includes any one or more of various data about the matter, including without limitation: Matter Name; Matter Number (s); Description; Matter Creation Data; Responsible Professional; Billing Contact(s) for that matter; any related documentation (including images); Powers of Attorney; pertinent contacts; and pertinent details about the matter. Client Name and Client Number information is preferably adapted to be transferred automatically to the Matter means, to avoid the necessity of key entry or manual transfer of the data.

Project Means

Figure 6A:
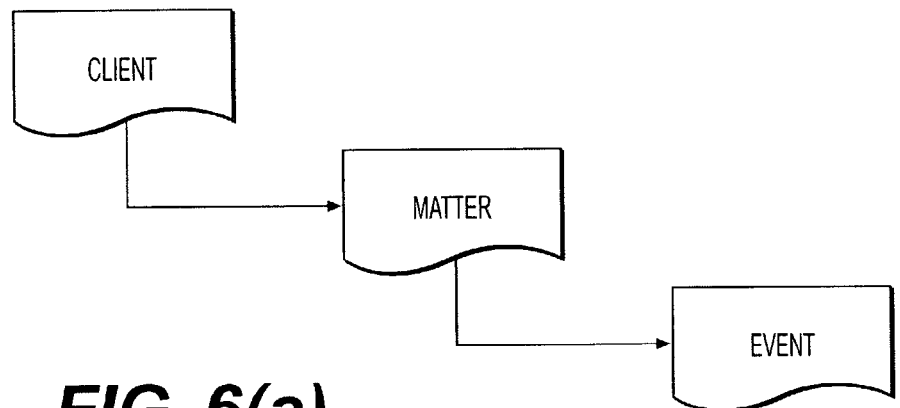
FIGS. 6(a) and 6(b) are flowcharts illustrating the data structure of an alternative preferred embodiment of the present invention, adapted for management of a legal practice.

Project Means may be used to identify multiple projects that are being carried out in conjunction with the same client and/or matter. Project Means preferably differentiate between multiple projects under the same general matter. Projects may be aggregated under Client Means, Matter Means, or both. Alternatively, Project Means may be omitted (FIG. 6(a)) and project level information maintained at the Client and/or Matter level.

Figure 6B:
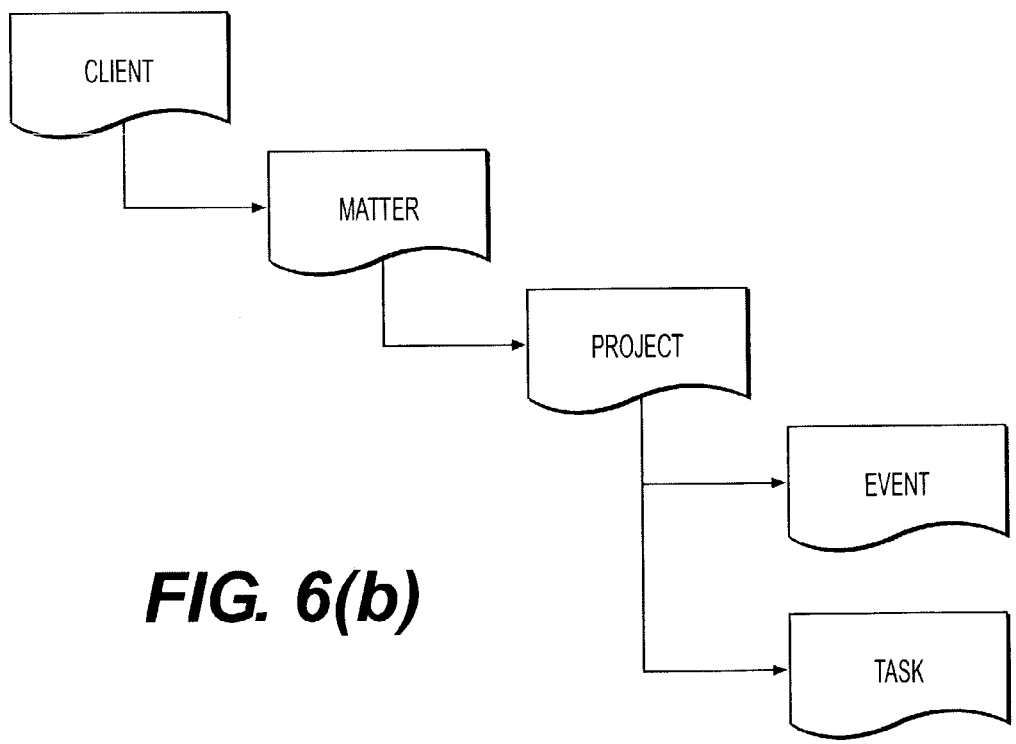
Figure 7:
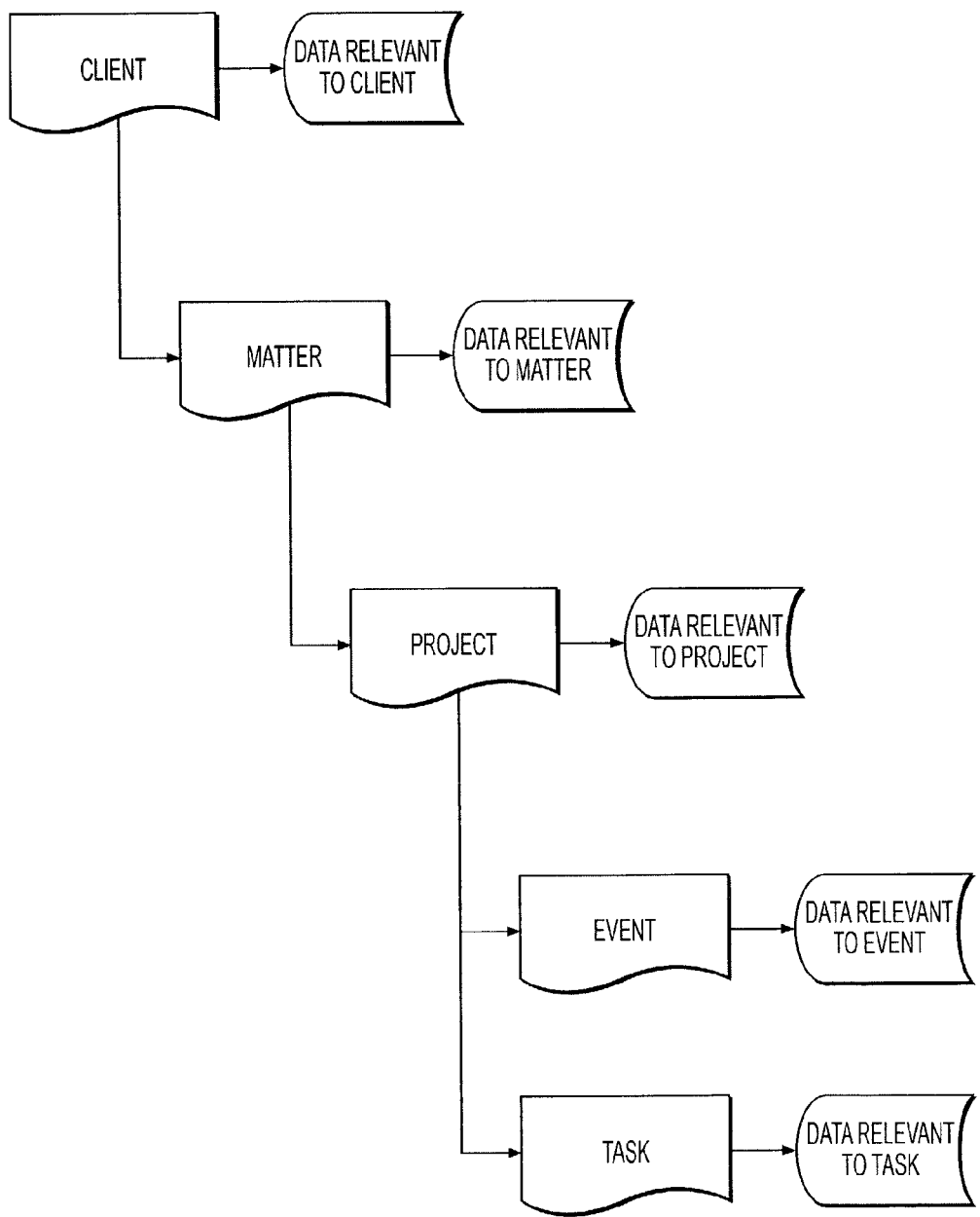
FIG. 7 is a flowchart illustrating the data structure of an alternative preferred embodiment of the present invention.
Figure 8:
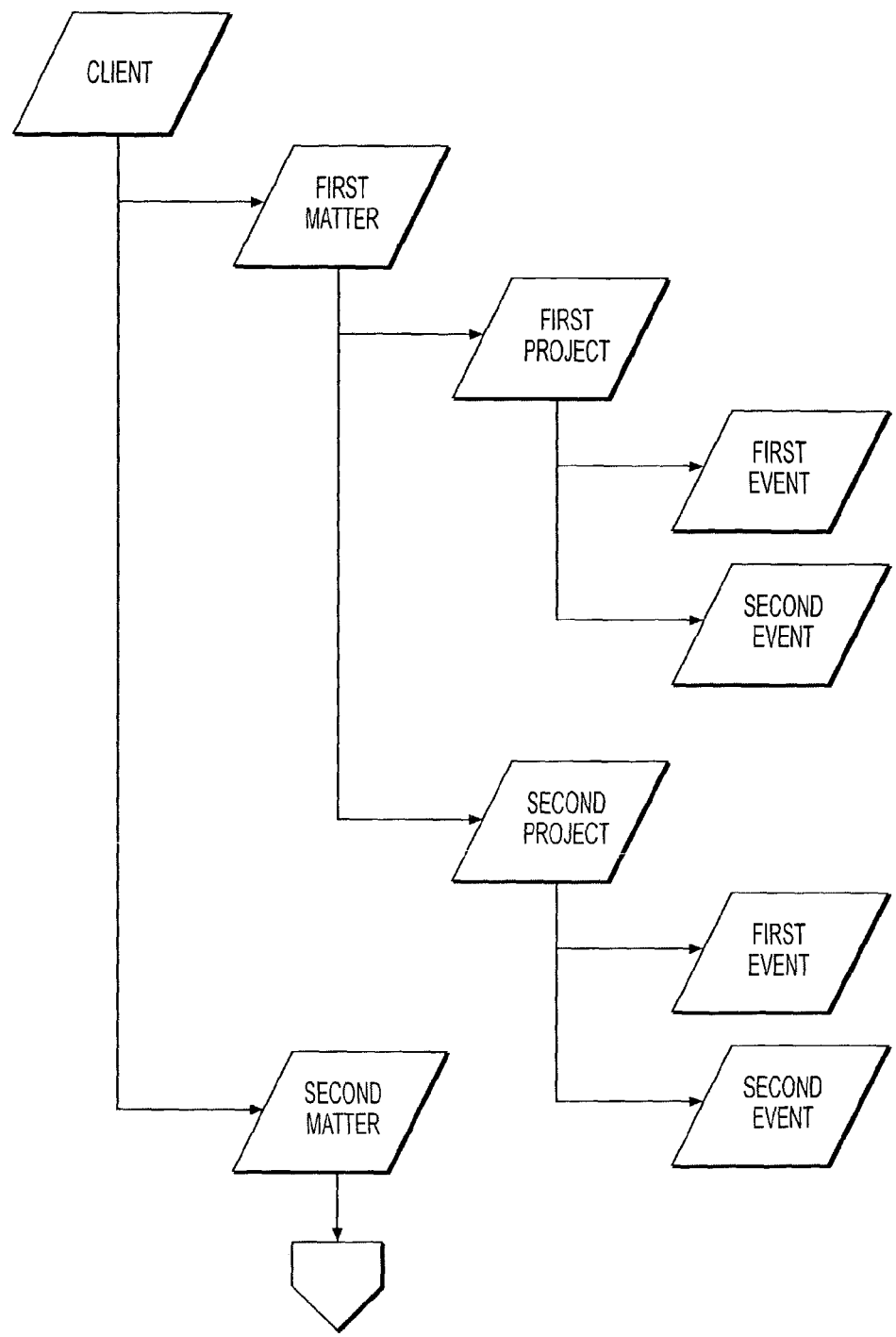
FIG. 8 is a flowchart further illustrating the data structure of an alternative preferred embodiment of the present invention.

For example, Project Means may be identified at the Client level (FIG. 6(b)), enabling multiple matter numbers to be issued for the same project in the accounting and/or docketing systems. Alternatively, Projects could be identified at the Matter level (FIG. 7), enabling multiple projects to be identified for the same matter in the firm's accounting and/or docketing system. Similarly, projects could be identified at both the client and matter levels, if desired. This flexibility enables the user to more precisely track activity or tasks in conjunction with rendering the professional services.

Project Means tracked by the present invention preferably include various data about the project, including without limitation: Type of project; Identifying numbers or codes; Description of the project; Country and Foreign Associates; Addresses; Comments; any Related Documentation; Affiliated Parties; Counsel, Courts, and Administrative Tribunals; Case Numbers; Responsible Person or Person(s) related to the project; Serial Numbers; any pertinent information related to any applications, registrations, or grants; Transfer information; Pertinent Dates; any other suitable information relating to the project. In alternative preferred embodiments, Project means is further adapted to cooperate with Client means, Matter means, Event means, or said Task means, or is subsumed within or merged with said Matter Means.

Event Means

Event Means preferably comprises data about significant events relating to the professional services being rendered. Event Means may comprise: Official Communications from Government Agencies, Orders, Motions, Notices, and any other pertinent events. Event Means may be maintained in any of the various native applications employed in the enterprise. An event may be recorded in the Docket, in physical records, or in an application specifically developed to support and record events. Alternatively, events may be recorded in any other suitable application.

Event means tracked by the present invention preferably include any one or more of various data about any significant event in conjunction with the project, including without limitation: Event Date; Date that the event record was created; Identification of the event; Description; Assessment of its impact; Milestones achieved or implicated by the event; Responsible professional; Routing information; and any other pertinent information about the event. Event means may further comprise information relating to retirement of the event.

The Client Name, Client Number, Matter name and Matter number information preferably is adapted to be supplied to the Event means automatically, without requiring additional key entry or transfer of data by the user.

Task Means

Task Means preferably comprises data about the task being performed. Task Means may track specific items of work that may be conducted in conjunction with rendering the professional services. Task Means tracked by the present invention may include any of various data about tasks relating to the services, including without limitation: Identification of the task; Description; Task Creation or Assignment Date; Due Date; any Milestones; Estimated time and resources to complete the task; Priority; to Whom the task has been assigned; Routing; and any other pertinent information about the task.

Task Means preferably are dependant from Matter or Project Means, at the same level of dependency as Event Means. Task Means preferably further comprises information relating to closure of the task.

The present invention preferably is adapted to enable Client Means, Matter Means, Project Means, and Event and Task Means to cooperate with one another and/or one or more external applications to facilitate transfer of data. For example, the Client Name, Client Number, Matter Name, and Matter Number information of the Client Means and Matter Means of the present invention preferably are transferred and automatically posted to the Event and Task Means of the present invention. Further, data is preferably transferred from one or more applications external to or cooperating with the present invention.

In alternative preferred embodiments, the present invention may further comprise one or more of: Documentation Means; Forms Means; Budget Means; Expense Means; Project Management Means: Project Evaluation Means; and Report Means. Each may cooperate with one or more of: Client means, Matter means; Project means; Event means; or Task means.

Documentation Means

Documentation Means may be provided to enable access to documents relating to the Project through the common data format interface, without having to separately access the records in their native application or through a document management application. Documentation means preferably includes links to several of the available documentation relating to a project, including without limitation: indices or summaries; document management system; document assembly system; links to the document(s), copies of the documentation in a common or different data format; or any other information about documentation desired by the user.

In a preferred embodiment of the present invention, Document Means further comprises an icon or link, in the Event Means or other field, to the document in a portable or application-independent format (such as an ODBC, relational databases; SQL, XML, HTML, .tif, .jpg, or .pdf file); over the Internet, an extranet, or intranet; a link to the document in a document management system in its native format; or other suitable means adapted to facilitate access to the document.

Forms Means

Forms Means may be provided to enable access to forms or work product precedents relating to the Project through the common data format interface, without having to separately access the records in their native application or through a document management or document assembly application. Forms Means preferably is adapted to certain milestones or Event Means that typically involve the preparation of certain forms in response. Once the milestone or event has been reached, the system preferably accesses the appropriate form. This access may include links to pertinent forms, including without limitation: indices or summaries; address information of the document in document management or document assembly systems; automatic assembly of the completed form from data available in the system of the present invention; links to the form document(s); copies of the forms in a common or compatible data format; or any other information about form(s) desired by the user.

Budget or Time and Billing Means

Budget Means may be provided to identify projected and actual budget performance for the project. Some of the tools that may be used in conjunction with the present invention preferably include, without limitation: Tables; Schedules; Spreadsheets; Databases; Graphs; Indicia; Icons; and any other means adapted to provide budget information for a project or matter. Budget Means of the present invention may take any format suitable for use in conjunction with the system for providing useful budgeting information. Budgets could be tracked separately by expenses and fees, as well as at various discrete stages of the project.

In the context of rendering legal services, various types of budgeting software are generally used, including without limitation: TMC; Elite; Broadway, CMS Open; and various others. Some of these software systems include budget modules or budget functionality that may be adapted for use in conjunction with the present invention. These prior systems, however, have been hampered by their inability effectively to deliver budgeting data to the user in a format in which it can readily be used or manipulated, such as Excel spreadsheets. It may be necessary, therefore, to export the data from these financial accounting software packages to other format(s) from which it can be used more effectively in management of the professional services practice. This export can be accomplished by dumping the data to spreadsheets adapted to cooperate with the system of the present invention through VLOOKUP Tables, SQL queries, or any other suitable means.

Data may be exported in particular format(s) so that they can be read by or transferred to the system and method of the present invention. Alternatively, data may be exported directly to the system to the present invention or to an intermediate database. Suitable databases could include: Crystal Reports; Excel; Notes; SQL; Windows-compatible; Cold Fusion; HTML; XML; relational databases; ASCII; ODBC-compatible; or any other format, that is adapted for use in conjunction with the system and/or method of the present invention.

For example, using a TMC Accounting system, the invention may export: Default budgeting information from the TMC system; Monthly Fees; Monthly Expenses; Accrued Fees (from inception, year to date, or other suitable period or by category), and/or Accrued Expenses (from inception, year to date, or other suitable period, or by category).

In the context of an intellectual property practice, for example, budgets could be established for any one or more of the following: Preliminary Patentability Assessment; Patent Application Preparation and Prosecution; Trademark Clearance; Trademark Application Preparation and Prosecution; Copyright Application Preparation and Prosecution; Opinion of Counsel; Patent Infringement Litigation; Trademark Infringement Litigation; Copyright Infringement Litigation; Patent Cooperation Treaty filings; Foreign Trademark Application filings; and any other project suitable for determination and tracking of a project budget.

Each of these categories of project types may be further defined based on the complexity of the project. For example, in a preferred embodiment of the present invention budgets are prepared based upon a simple, intermediate, or complex level of effort for patent infringement claims or patent preparation and prosecution. Similarly, varying levels of budgeting could be offered to the user based upon the complexity of a trademark infringement claim, or other projects.

Budget means tracked by the present invention preferably includes variations of the budget and expenditure information about the project, including without limitation: estimated budget(s) for the project; breakdown by stages; fees and expenses; accrued costs; payables information; accounts receivable information; graphical comparisons of projected budget and actual expenditures; and any other information desired about the financial performance of the project.

In alternative preferred embodiments of the present invention budget means further comprises a graphical interface for indicating to the user the budget for the project relative to the accrued fees and expenses to date. This can be accomplished through any suitable graphical interface, such as the silo format, employed in many video games for depicting resources relative to expenditures, or other suitable format.

Project Management Means

Project Management Means may be provided to enhance management of the professional services project. Links to tools such as Microsoft Project and/or Project Gateway databases that provide project management tools may be adapted to cooperate with the aggregated data.

In alternative preferred embodiments, flowcharts may be provided of the steps being performed in conjunction with the project. The flowchart may be colored, illuminated or provided with any other suitable indicator of the progress of the project. In preferred embodiments of the present invention these milestones may be keyed to certain event means achieved during the course of the project.

Project Evaluation Means

Project Evaluation Means may be provided to assess the project. Risk assessment tools, such as litigation risk management tools, decision tree tools, and various other tools could be provided and/or adapted to the aggregated data. For example, TreeAge or other suitable risk assessment software may be coordinated with the present invention to cooperate to provide project evaluation tools based upon the aggregated data.

Reporting Means

Reporting means may also be provided to enable the project manager to "slice and dice" the aggregated data in various ways to create and prepare various assessments. In preferred embodiments of the present invention, it may be desired to summarize the data in Excel spreadsheets or other suitable summary formats. In a preferred embodiment of the present invention, reporting systems, such as Crystal Reports, can be adapted to provide the reporting function of the present invention.

Data Transfer Means or Data Warehouse

The present invention may be implemented in a separate software application, such as a database or data warehouse running in Lotus Notes or other suitable application, or through direct transfer of the data 100 from the native applications 200 to the end use application 500, as needed. If implemented through a separate project management database, it may be desired to transfer certain data from applications in which it is native, such as a docketing or accounting system, to the project management application 400.

In the example of a dedicated Lotus Notes application the following mapping may be employed from a docketing system, such as CPI, to the Lotus Notes application.

TABLE 1

Exemplary Data Mapping from CPI Docket to Lotus Notes Project Management Application

| DESCRIPTION | CPI ENTRY | TRAQCS ENTRY TO TRIGGER | FLOW CHART DESCRIPTION |
|---|---|---|---|
| Provisional Application Filing Receipt | Docket Application Expect Provisional | EVENT: Filed Provisional Application | File Provisional Application |
| Provisional Application | Filing Receipt | EVENT: Received Provisional Filing Receipt | Provisional Filing Receipt issued |
| Non-Provisional Application Filing Receipt | Docket Application | EVENT: Filed Non-Provisional Application | File Non-Provisional Application |
| Non-Provisional | Expect Filing Receipt | EVENT: Received Filing Receipt Non-Provisional | Non-Provisional Filing Receipt issued |
| Missing Parts | US MISSING PARTS-F | EVENT: Received Notice of Missing Parts | Notice of Missing Parts |
| Response to Missing Parts | Filed Response to Missing Parts | EVENT: Filed Response to Notice of Missing Parts | Respond to Notice |
| Restriction | US-RESTRICTION | EVENT: Received Restriction Requirement | Restriction |
| Elect Claims | Filed Response to Restriction Requirement | EVENT: Filed Response to Restriction Requirement | Elect Claims |
| Office Action | US-3 MONTH OA | EVENT: Received Office Action | Office Action |
| Response to Office Action | Filed Response to Office Action | EVENT: Filed Response to Office Action | Respond to Office Action |
| Final Office Action | US-FINAL OA | EVENT: Received Final Office Action | Final Office Action |
| Response to Final Office Action | Filed Response to Final Office Action | EVENT: Filed Response to Final Office Action | Respond to Final Office Action |
| Advisory Action | Received Advisory Action | EVENT: Received Advisory Action | Advisory Action |
| Notice of Allowance | US-ALLOWANCE | EVENT: Received Notice of Allowance | Claims Allowed |
| Issue Fee | Paid Issue Fee | EVENT: Paid Issue Fee | Pay Issue Fees |
| Deed of Letters Patent | EXPECT PATENT | EVENT: Received Deed of Letters Patent | Patent Issues |
| Maintenance Fees | Tax 3.5 | EVENT: Paid Maintenance Fee 4th year | Maintain Patent 4 yr. |
| | Tax 7.5 | EVENT: Paid Maintenance Fee 8th year | Maintain Patent 8 yr. |

TABLE 1-continued

Exemplary Data Mapping
from CPI Docket to Lotus Notes
Project Management Application

| DESCRIPTION | CPI ENTRY | TRAQCS ENTRY TO TRIGGER | FLOW CHART DESCRIPTION |
|---|---|---|---|
| | Tax 11.5 | EVENT: Paid Maintenance Fee 12th year | Maintain Patent 12 yr. |
| Appeal | US-APPEAL BRIEF | EVENT: Filed Appeal | Appeal |
| Abandonment | US-REVIVE | EVENT: Received Notice of Abandonment | Abandon |
| Continuation Application | EXPECT PTO LTR | EVENT: Filed Continuation Application | Continue |

The data may be drawn from the docketing application as it is entered and published to the Notes application, as a result of periodic SQL server queries, and transferred to the project management application, or through any other suitable means.

Notes Project Management Database System

The system and method of the present invention are preferably implemented through a personal computer-based system, operating in a network environment, using local and wide area network server technology of the type well known in the art. In a preferred embodiment, the system of the present invention is preferably implemented on Novell network, with database 400 running on a Lotus Notes server, cooperating with an SQL server 300 in communication with various servers, routers and network components on which the software applications are maintained, to facilitate access to various documentation, docketing, accounting, budgeting, and billing information as desired.

The present invention may be implemented through various alternative software and/or hardware systems, including, without limitation: data standardization; Lotus Agenda; Lotus Notes; Lotus Notes in conjunction with an SQL Server; Java; and various Web-enabled protocols. Thus, it is intended that the invention is not limited to any particular hardware or software application(s) or implementation.

Figure 5:
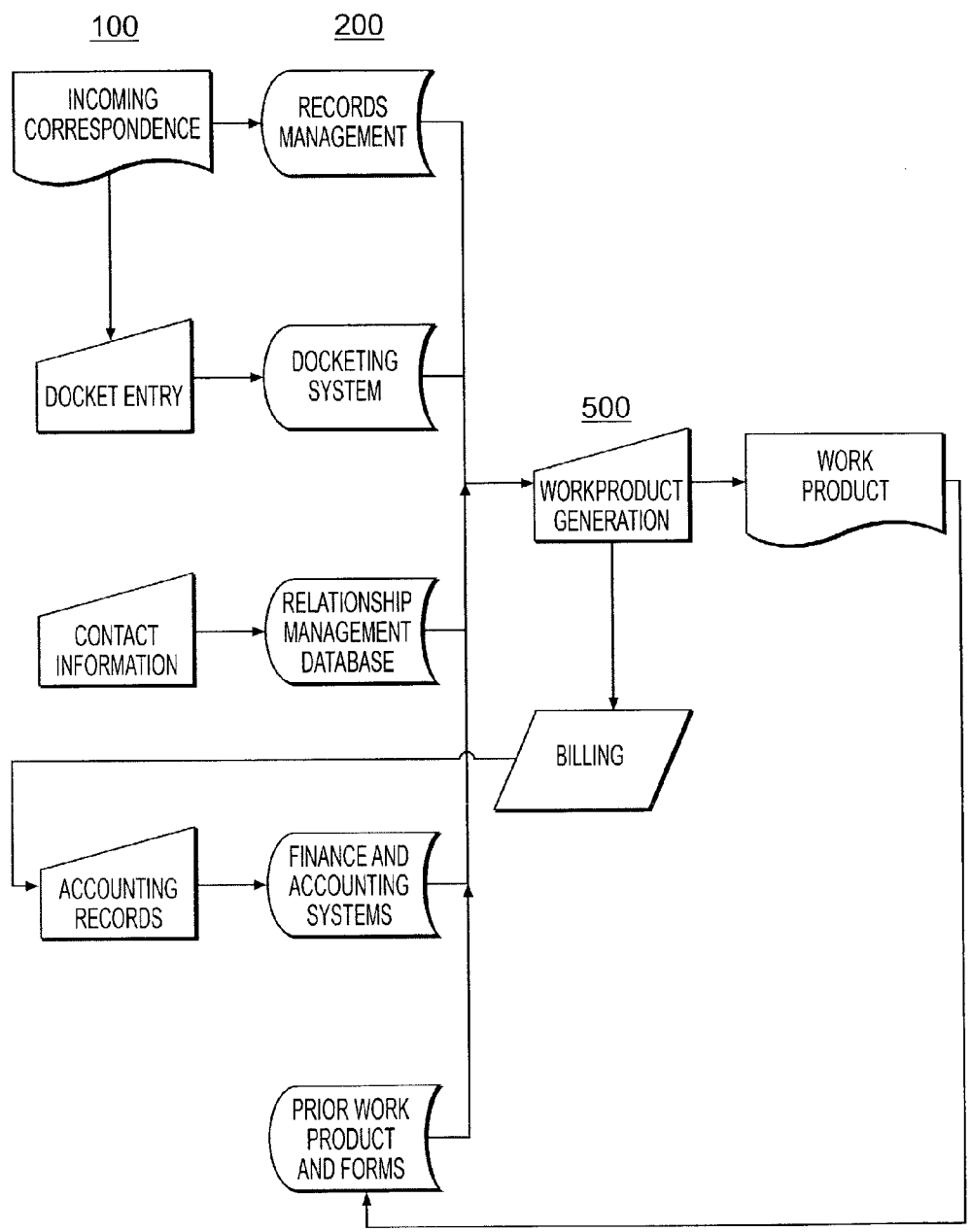
FIG. 5 is a flowchart illustrating the flow of data between various proprietary applications of the type known prior to the present invention, in the setting of a legal practice.

In an alternative preferred embodiment, as shown in FIG. 5, data means 100 is maintained in various data storage means 200 and application means 500: docketing data in a proprietary format such as CPI; accounting data in a proprietary format such as TMC; records in physical (paper) copies, email (ftp, ip, html, xml or other web enabled formats), and/or electronic image files (.tif, .pdf, .jpg and other formats), and related indices (document management systems such as DocsOpen); Address Books in a relationship management system (such as Notes Address Books, Rolodex, iEnterprise or other relationship management software); Word Processing and Work Product in word processing applications (Word and/or WordPerfect) and related indexing systems (such as DocsOpen or SoftSolutions); presentation tools (such as PowerPoint and Corel Presentations); and evaluation tools (such as Excel, Corel Quatro Pro, TreeAge decision tree software and other risk evaluation tools). Some of these formats are common (relational databases, SQL databases, HTML, and XML), while others are proprietary (CPI, TMC, Microsoft Word, Microsoft Excel).

To the extent the native application formats, although proprietary, are compliant with a common data standard, such as ODBC, the data may be transferred to a database or the project management application of the present invention. Alternatively, when the native application format(s) are incompatible, the data may be retrieved through queries of the type well known in the art (such as SQL queries), converted, and exported to another database in which it can aggregated or integrated with other data. Alternatively, the data may be exported then converted once in database 400.

These conversions and transfers are carried out in a manner well-known in the art. For example, as shown in FIG. 9, the data may be exported from the various native applications to a SQL data base, the SQL database can be queried, and the data transferred to the project management application database 400. Persons of ordinary skill in the art would readily appreciate the various alternative means for implementing the invention as described in this application.

Data storage means 200 preferably comprises data storage systems of the type well-known in the art. This comprises any one or more of: hard drives; network drives; floppy or zip drives; tape or disc drives; any other suitable optical, magnetic, or other memory; or various types of data storage devices. Alternatively, by employing common data formats or proprietary formats that are adapted to transfer information to common formats, it may be possible to eliminate the use of physical storage devices and access the information directly from its source, as needed. The invention, therefore, preferably further comprises data transfer means 300 for transferring the data from its source to the application(s) in which it is used.

Thus, data storage means 200 and/or data transfer means 300 are intended to comprise the various hardware, software, and operational techniques that enable transfer of and access to the data, as needed, whether in "real time," near real time, or on a predetermined schedule, as the data is needed, or through the use of any of the various storage means that are well known in the art. For example, data transfer means 300 may comprise a SQL server, adapted to receive data from one or more native applications and delivering the data to a Notes database.

Database means 400 is preferably a practice management database, adapted to display the aggregated information. In a preferred embodiment of the present invention database 400 may be a Notes database adapted to receive data means from various data storage means 200 or data transfer means 300. Data preferably is received in database 400 in common and/or proprietary formats, and made accessible to the user through database and one or more application means. The data may be converted from its native format into a common format, retained in one or more of the native formats, converted to one or more proprietary and/or common formats.

As depicted in FIGS. 6(*a*), 6(*b*), 7, and 8, for various preferred embodiments of the present invention, the hierarchy of database 400, may be: (1) Client Means; (2) Matter Means; and (3) Event Means (FIG. 6(*a*)). In an alternative preferred embodiment, the hierarchy may be: (1) Client Means; (2) Matter Means; and (3) Event Means and Task Means. Alternatively, the hierarchy may be (1) Client Means; (2) Matter Means; (3) Project Means; and (4) Event and Task Means (FIG. 6(*b*)). In further preferred alternative embodiments, the hierarchy may be: (1) Client Means; (2) Project Means; (3) Matter Means; and (4) Event and Task Means.

Application means 500 comprise any of the various applications that are typically used in a business and, in particular, in a professional services practice. These may include, in the example of a law practice: word processing; document assembly; document management; time keeping; accounting; cost recovery; budgeting; billing; document retrieval; work product precedents; forms; evaluation tools; spreadsheets; docketing systems; legal research systems; statutory, regulatory, and case law precedents; legislative and/or regulatory tracking systems; specialized knowledge systems for various types of practices; and various other applications.

It will be apparent to persons of ordinary skill in the art that various modifications and variations may be made in connection with the system of the present invention, without departing from the scope of the invention as claimed. For example, the invention may be implemented with any suitable data storage and/or transfer means. The order of the steps, and in particular storage and transfer of the data are not critical. Data may be stored in the native application and accessed as needed. Alternatively, data may be stored in a portable or application-independent format. Further, data could be accessed by the application either as needed or on the basis of periodic updates and stored in the application being used to display the data. Thus, the order of the steps and the specific location where any one or more of the data means are stored are not critical. The data desired need only be available when needed.

As a further example, the data formats used for the common data formats, proprietary data formats, and any combination of the two are not critical. Although common data formats are preferred, the invention may be implemented through proprietary formats and conversion of the data as necessary. Similarly, the data may simply be converted from its native format to any intermediate format or a final format. Thus, it is intended that the present invention comprise the various modifications and variations of the invention that would be known to persons of ordinary skill, provided they come within the scope of the appended claims and their equivalents.

Method of the Invention

The method of the present invention preferably comprises various known techniques for aggregating data that have not traditionally been used in a professional services practice, and applies them in a professional services setting. Data identifying the client, matter and/or project, preferably are aggregated with budget data (accounting), and/or information or documentation about events, and/or information about deadlines (docketing), to support management of the professional services project. The project management application of the present invention preferably provides reporting about the status and progress of the project to the professional, as well as to the client through a virtual private network web interface to the application.

FIGS. 1, 4, 5, 12, and 13, depict various aspects and preferred embodiments of the practice management application of the present invention. FIG. 1 is a conceptual diagram depicting the function of the method of the present invention to store 200 and act as a warehouse 400 for data 100 that is useful in the management of the practice. FIG. 1 further depicts the transfer of the data back out to various applications 500. FIG. 4 is a necklace diagram depicting the input and transfer of data means 100 from various applications 500 used in the practice to the database 400 of the present invention.

FIG. 2 depicts the flow of information between various databases, applications, and functional areas of a law practice. FIGS. 1 and 2 depict various database systems that are typically used in a professional services practice: accounting; docketing; records management; word processing; document management; document assembly; knowledge database of work product precedents, and forms; various address lists for clients, vendors, business development, and other contacts (client relationship management); as well as other data. Prior to the present invention, these databases generally were not adapted to cooperate with one another. In fact, the ability of the users to transfer data between applications was frequently severely constrained.

As shown in FIG. 2, once entered in either the accounting or docketing means, address information may be transferred to address means. Alternatively, even if entered in multiple locations, address data may be cross-checked and/or verified against information in accounting means, docket means, third party data sources such as web sites of addresses, electronic yellow pages, or other data sources, to reduce or eliminate errors in key entry. Address means may be maintained in one location and transferred to other applications in which it is needed through database 400 or to other software applications used in the practice. The order and timing of entry of the transfer and aggregation of the address means between the accounting, docketing, and address means is not critical. Thus, the present invention preferably resolves many of the prior known constraints on the transferability and aggregation of data.

FIG. 2 depicts a series of potential transfers 300 of data 100 between various data means 100, data storage means 200, and application means 500, through database 400. As depicted in FIG. 2, using common data formats, data may be transferred 300 in real time or near real time, without the need for intermediate databases 200 or 400. Alternatively, whether in proprietary or common data formats, data 100 may be transferred 300 from data storage means 200 to applications 500 where the information is needed to manage the practice. Database 400, as shown in FIGS. 1, 4, 9, and 12, may aggregate the data and provide a central repository for needed information.

Data may be converted to facilitate the direct transfers as depicted in FIGS. 2 and 5. Alternatively, as shown in FIGS. 1 and 4, one or one or more intermediate databases may be employed to transfer the data from one or more native proprietary formats, to a portable or application-independent format in which the data may be aggregated and employed effectively in managing the project.

As shown in FIG. 2, docketing information may be transferred to a word processing, document management system, status reporting, address storage, accounting systems. Accounting information may be exchanged with docketing and may be used to establish client entries in docketing, after a new client or matter has cleared conflicts and been opened in the firm's accounting system. Time keeping records are entered, and transferred to accounting, from where they are used in the billing process. Similarly address information is frequently needed in word processing applications, docketing, and accounting. As shown in FIG. 2, address data may be readily transferred between all three applications.

The firm's knowledge base may comprise forms and/or prior work product housed in its document management system, a separate database of prior work product, a forms directory or database, third party sources of forms and/or precedents, document assembly systems, various web-based sources of precedents, or email attachments providing forms or precedents for use by the professional in completing the project. Word processing documents may be transferred to various features of the firm's knowledge base and records systems, including prior work product data base, forms, and records. Similarly, prior work product may be retrieved by the firm's document retrieval system for use in generating new work product through the work product generation process.

In alternative preferred embodiments, as depicted in FIG. 5, data means 100 are preferably transferred 300 to corresponding data storage means 200 from where they are transferred to applications means 500. This can be accomplished in any of several ways: standardizing the data means on a common format among the various data storage means and application means; using the same proprietary format among the data means to the degree necessary to achieve transferability of the data means to the data storage means and application means involved; or converting each data means from its native proprietary format in the respective data storage means or application means in which it is native to either a common format or the native format of the recipient data storage means of application means. As shown in FIG. 5, the docketing, accounting, and address data means are coordinated in the management of the project.

In alternative preferred embodiments, data may be adapted to be transferred automatically or on a predetermined schedule. For example, certain events may be considered milestones for the advancement of a project. These milestones may be identified and, when they are reached in the docketing system, a message transferring the appropriate data sent to a project management or other database. As an example, certain docketing events may be designated as milestones. These milestones may be correlated to certain events, and when they are reached, a message is sent to a Notes database identifying that the milestone has been reached and making an appropriate event entry and designating the progress of the project through an indication on a flowchart of the project, with links to any applicable documentation. Docketed entries may be mapped as standard milestone events, which trigger automatic entries and indicators in the event and project management means.

Method and System for Quality Control of Professional Services

Professional services are inherently personal in nature, posing substantial challenges in ensuring control over the quality of professional services, particularly in a large corporate or law firm setting. By modeling, tracking, and monitoring of the delivery of professional services, the present invention provides a means for enhancing the quality control of professional services.

Various quality control systems have been introduced in a number of business settings. One system of quality control that has received substantial recent press attention is the so-called "Six Sigma" system, pioneered by Motorola. Harry J. Mikel and Richard Schroeder, SIX SIGMA: The Breakthrough Management Strategy Revolutionizing the Worlds' Corporations ($1^{ST}$ ed. 2000), which is incorporated herein by reference, as if fully set forth herein. Six Sigma systems have been successfully implemented by Motorola, Allied Signal, General Electric, and others, often with substantial positive results.

Although Six Sigma systems have enjoyed substantial success in manufacturing operations, quality control over service functions and professional services (such as legal) in particular have been more problematic. Some companies, such as DuPont, have implemented Six Sigma quality control systems in their legal department. Few if any technical tools are available to law departments to implement the rigorous measurement protocols necessary for effective quality control. Certain embodiments of the present invention may provide the necessary tools for assessing, monitoring, and measuring performance relative to these types of quality control procedures.

Any quality control program, whether a Six Sigma or other program, requires detailed modeling, monitoring, and measurement of performance. Specifically, a Six Sigma program seeks to identify the number of "defects" per requirement for a functional area. The requirement is sampled continuously (or continually) and the number of defects is measured. One "sigma," (standard deviation) is about 317,400 defects per million; four sigma about 6,200 defects per million; and six sigma, about 3.4 defects per million). The actual sigma value that is desired depends on a number of factors and the cost-effectiveness achieving that degree of reduction in defects relative to the cost of the defects.

The client's expectations or requirements for a particular professional service can be determined and delivery of the service monitored to determine the number of times the service is actually delivered within that parameter or outside of it (a failure). The service can then be modeled and the root causes of the failure are then assessed to determine ways in which the process of delivery of the service can be reengineered and improved in a cost effective manner. Id.

These steps require not only definition of the workflow but monitoring and measurement of the delivery of the service, functions can be readily accomplished in conjunction with the present invention. In order to identify process improvements, the process itself must be defined and documented. These are accomplished in the project management functions of the present invention.

Figure 14:
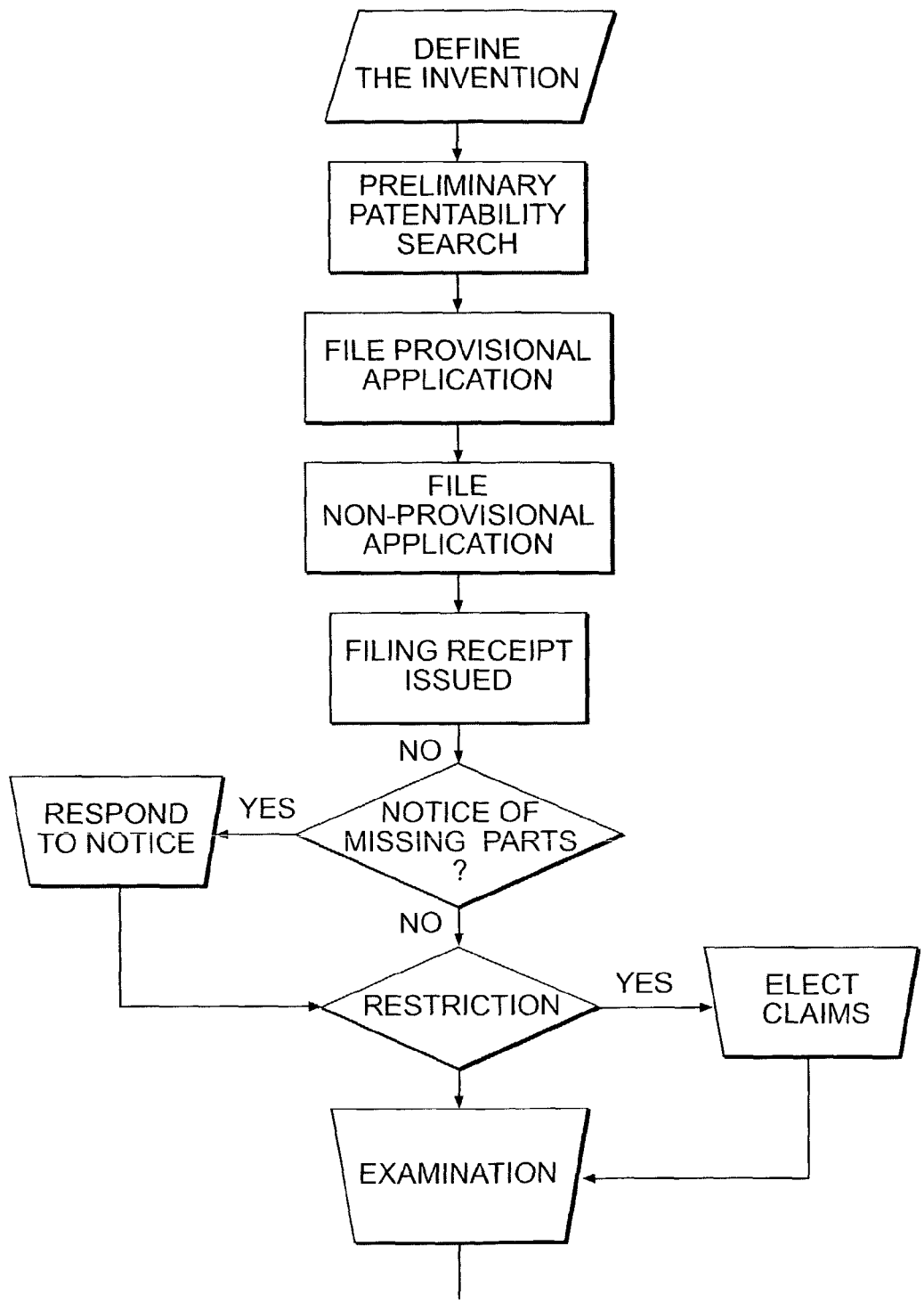
FIG. 14 is a flowchart depicting a process for securing a U.S. patent.
Figure 14:
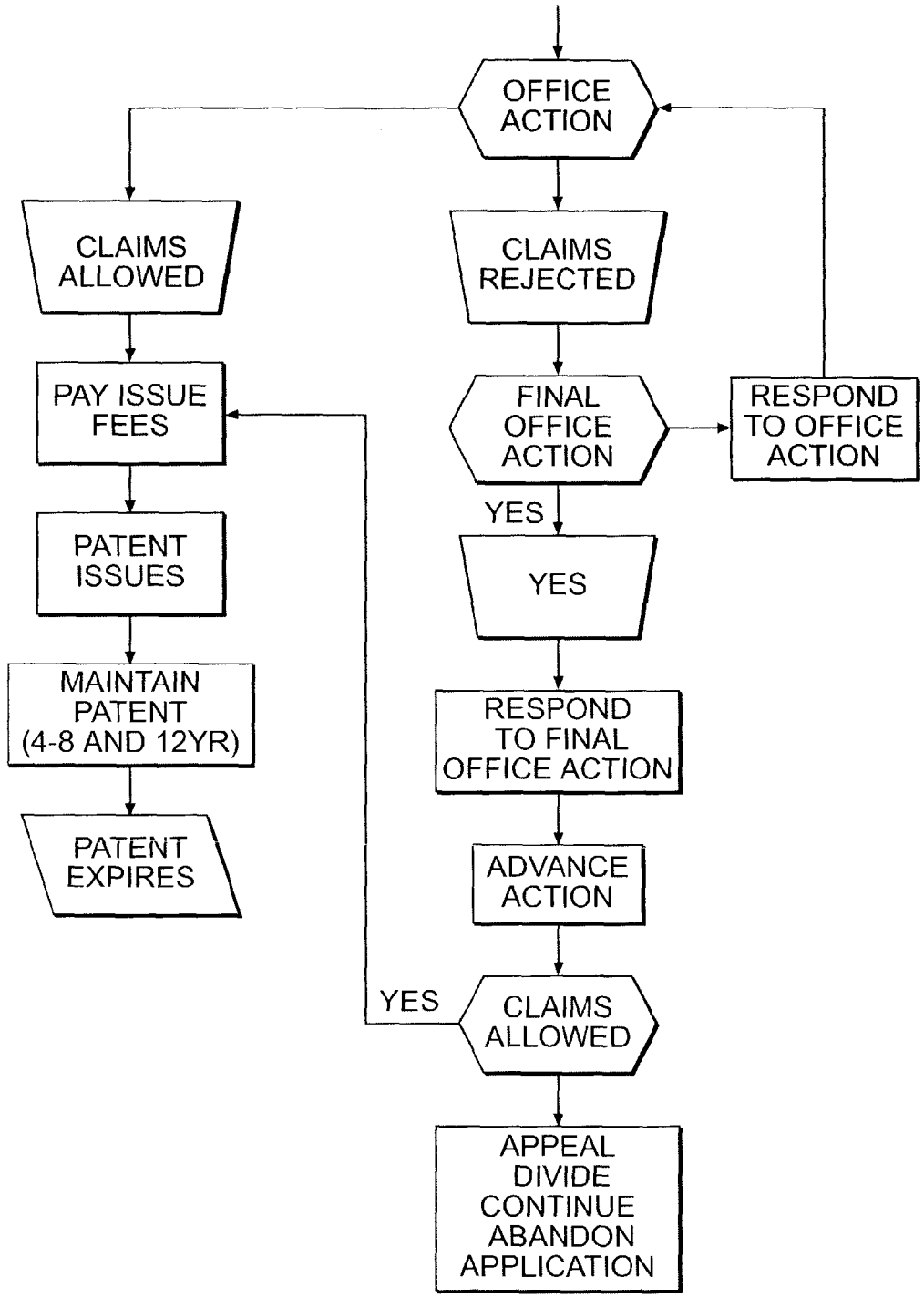
Figure 15:
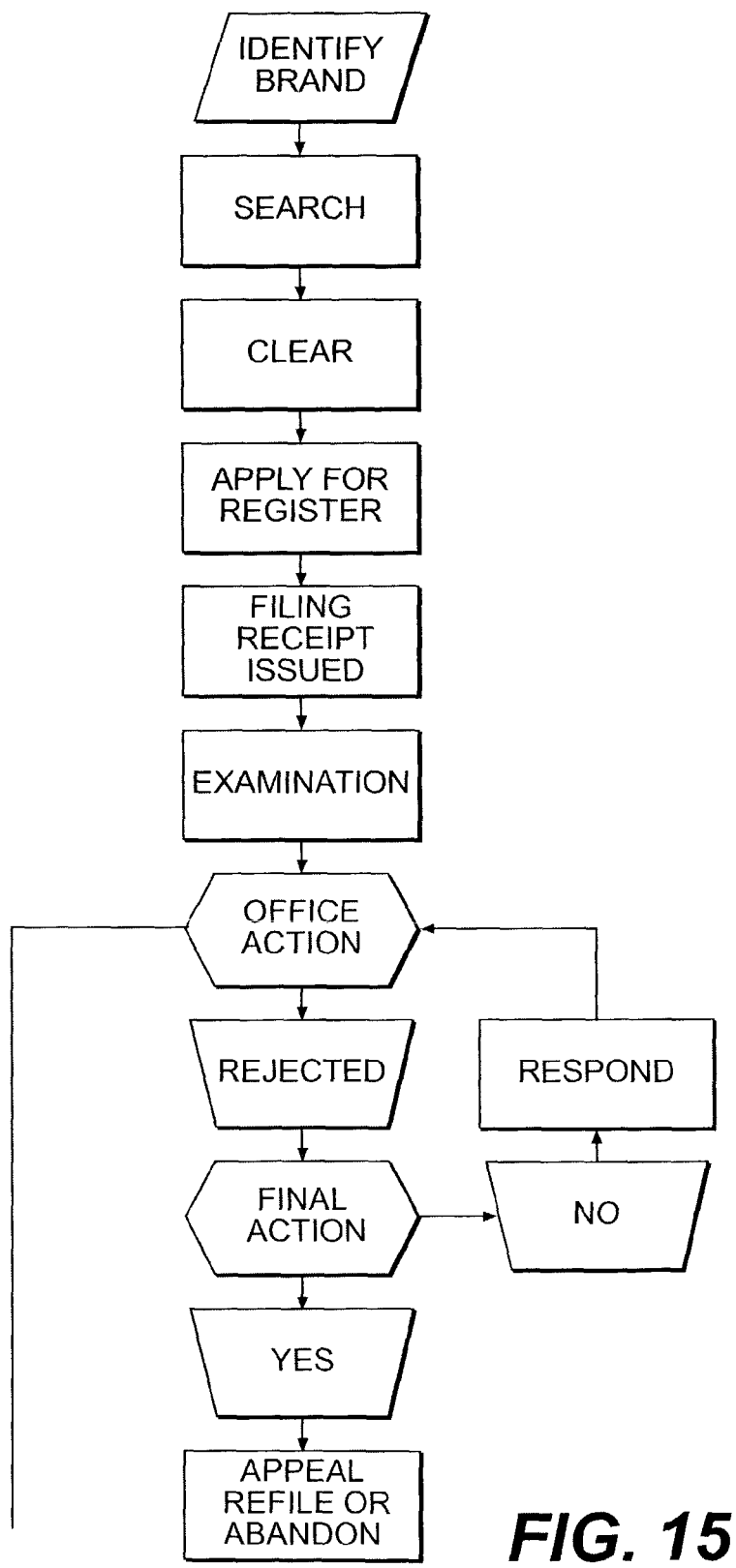
FIG. 15 is a flowchart depicting a process for securing federal registration of a trademark in the United States.
Figure 15:
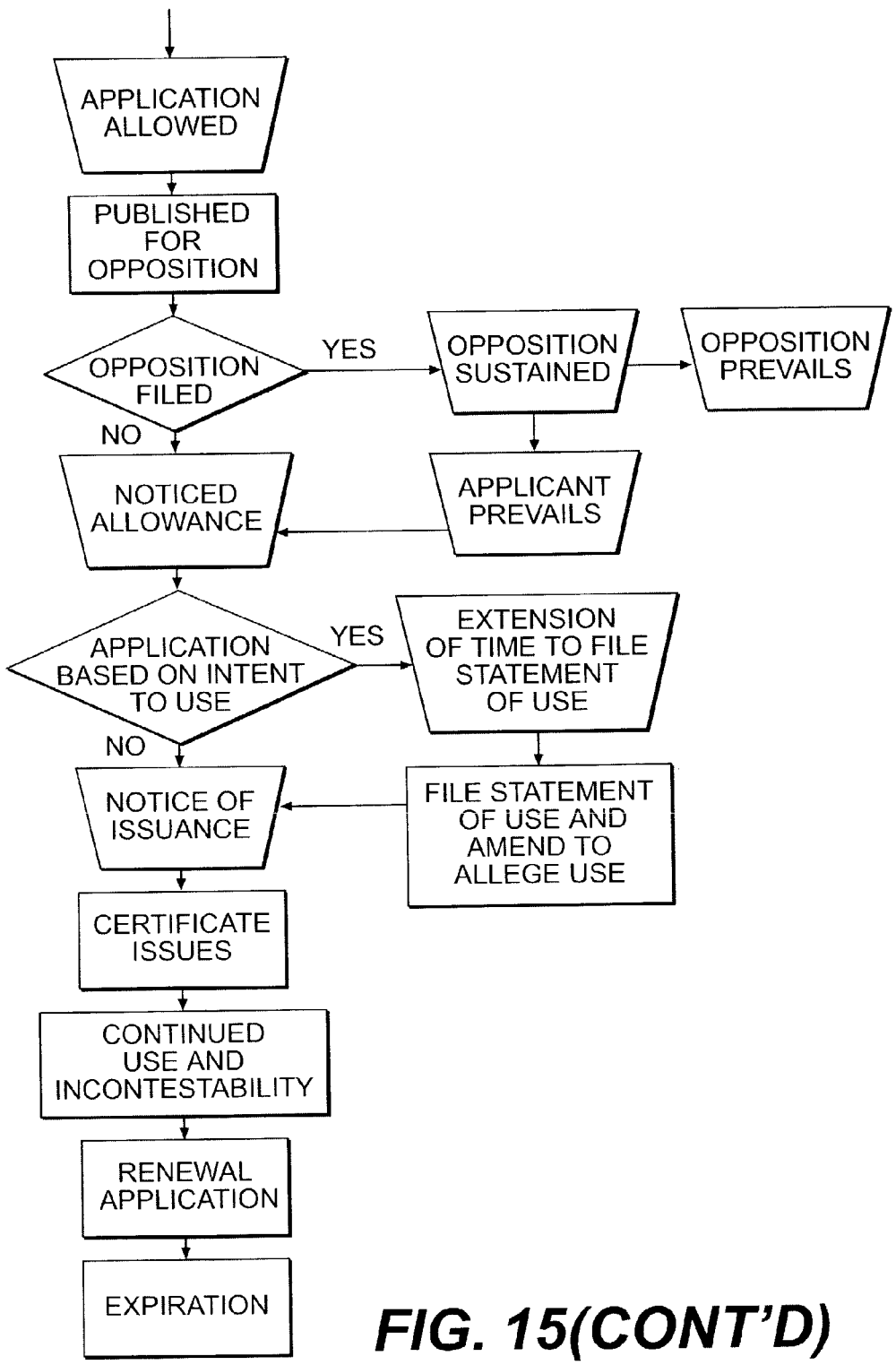
Figure 16:
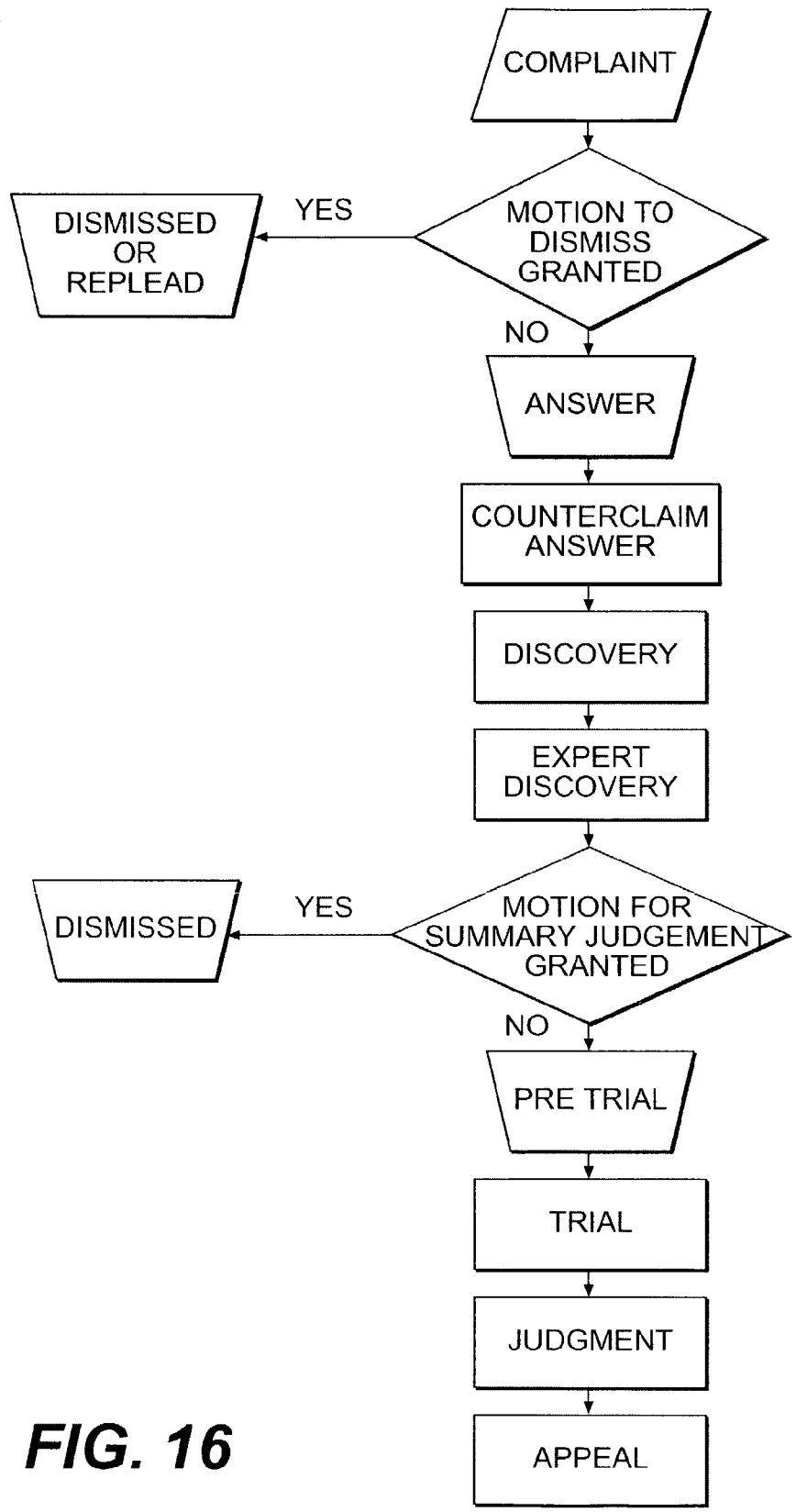
FIG. 16 is a flowchart depicting the work flow process of a representative intellectual property infringement litigation matter.

For example, in the context of a patent application, the process workflow may be defined and documented in conjunction with providing the user an indication of the stage of the process that has been attained. FIG. 14 depicts an example of a sample flowchart for the process of securing a U.S. patent; FIG. 15, a process for securing U.S. trademark registration; and FIG. 16 a process of a typical intellectual property infringement litigation matter. Requirements may be established for any stage(s) of the process that are significant to the client. As a further example, the service provider could define specific time period for reporting events, submitting drafts for review, returning edited drafts, etc. Similarly, requirements could be based on further substantive parameters of the work product, such as compliance with certain guidelines or more subjective criteria relating to the content of the work product. These requirements may then be stored in one or more of the applications or in a project management application, such as that described above.

In the example of implementing the present invention through a separate project management application, the project management application software could then compare the actual event timing that is reported to the project management application or entered directly in the project management application with the requirement that has been determined and stored in the project management application (for example sending to the client Official Communications received in conjunction with the matter within 2 business days of receipt, returning calls within 24 hours, etc.). Thus, the level of "defects," and the efficacy of any process changes that are made to reduce the number of defects, can be monitored easily and with minimal or no manual intervention.

It will be apparent to persons of ordinary skill in the art that variations and modification may be made to the present invention. For example, the order of steps in the process of the present invention, the particular hardware and software implementation are not critical. The present invention is also preferably adapted to track and manage quality control systems for the management of business processes other than a professional services practice. Thus, it is intended that the variations and modifications of the invention and its components are considered part of the invention, without departing from the scope or spirit of the invention as disclosed and claimed, provided they come within the scope of the appended claims and their equivalents.

I claim:

1. A non-transitory computer readable storage medium comprising:
  a processor configured to execute a legal services case management software application, the software application for use in conjunction with a legal services project, wherein the software application is configured to:
  receive data from a first distributed application, wherein the data from the first distributed application is received in a non-proprietary format and is associated with a client identifier and a matter identifier;
  receive data from a second distributed application, wherein the data from the second distributed application comprises at least one of docketing, calendaring, accounting, or time and billing data, and wherein the data from the second distributed application is received in a proprietary format, wherein the proprietary format is application specific, and the data from the second distributed application comprises at least one of docketing, calendaring, accounting, or time and billing data and is associated with the client identifier and the matter identifier;
  wherein the data from the first distributed application in the non-proprietary format comprises at least one of ODBC data, Cold Fusion data, relational database data, SQL data, HTML data, XML data, SOAP data, WAP data, IP data, TCP/IP data, HTTP data, FTP data, TIF data, JPG data, PDF data, ASCII data, Open Source data, ZMerge data, Windows-compatible data, Lotus Enterprise Integration data, or Lotus Notes data;
  secure, on an automated basis via the processor, the data from the first distributed application wherein securing the data includes storing the data by requiring one of: key entry, voice recognition, optical scanning, data or data transfer for access;
  secure, on an automated basis via the processor, the data from the second distributed application wherein securing the data includes storing the data by requiring one of: key entry, voice recognition, optical scanning, data or data transfer for access;
  combine both the secured data from the first distributed application in the non-proprietary format and the secured data from the second distributed application in the proprietary format into a single record that is defined by the client identifier and the matter identifier, wherein the combined secured data is integrated in a portable format of the legal services case management software application, wherein the portable format is different from the format of the first application and the format of the second application; and
  storing the combined secured data in the portable format in a database for access by the legal services case management software application.

2. A method, in a data processing network for use in a legal services practice, the method comprising:
  a. receiving data from a first distributed application, wherein the data from the first distributed application is received in a proprietary format, is associated with a client identifier and a matter identifier, and comprises at least one of docketing, calendaring, accounting, or time and billing data;
  b. receiving data from a second distributed application, wherein the data from the second distributed application is associated with the client identifier and the matter identifier;
  c. securing, on an automated basis via a processor, the data from the first distributed application wherein securing the data includes storing the data by requiring one of: key entry, voice recognition, optical scanning, data or data transfer for access;
  d. securing, on an automated basis via a processor, the data from the second distributed application wherein the data from the second software application is received in at least one of:
    a proprietary format, wherein the proprietary format is application specific, and the data from the second distributed application comprises at least one of docketing, calendaring, accounting, or time and billing data, or
    a non-proprietary format, wherein the data from the second distributed application comprises at least one of ODBC data, Cold Fusion data, relational database data, SQL data, HTML data, XML data, SOAP data, WAP data, IP data, TCP/IP data, HTTP data, FTP data, TIF data, JPG data, PDF data, ASCII data, Open Source data, ZMerge data, Windows-compatible data, Lotus Enterprise Integration data, or Lotus Notes data;
  e. combining both the secured data from the first distributed application in the non-proprietary format and the secured data from the second distributed application in the proprietary format into a single record that is defined by the client identifier and the matter identifier, wherein the combined secured data is integrated in an additional format of a case management software application, the additional format being different from the format of the first distributed application and the second distributed application; and
  f. storing the combined data in storage accessible by the case management software application.

3. The method of claim 2, wherein the data from the second distributed application is in a proprietary format.

4. The method of claim 2, wherein the combined data stored in the storage accessible by the case management software application is incompatible for use by the first distributed application and the second distributed application.

5. The method of claim 2, wherein the case management software application is configured to secure the data from the first distributed application and the data from the second distributed application.

6. The method of claim 5, wherein the case management software application secures the data from the first distributed application and the data from the second distributed application via an ODBC-compliant driver.

7. A system for accessing legal services related data from one or more databases in which the data is maintained in one or more proprietary formats, comprising:
   a. a first database configured to retrieve data from a project management application in a first format on an automated basis, wherein the data in the first format is associated with a client identifier and a matter identifier and the retrieval of the data includes key entry, voice recognition, optical scanning, data or data transfer, and wherein the first format comprises a proprietary format that is application specific;
   b. a second database configured to retrieve data from the project management application in a second format on an automated basis, wherein the data in the second format is associated with the client identifier and the matter identifier and the retrieval of the data includes key entry, voice recognition, optical scanning, data or data transfer, and wherein the data in the first format and the data in the second format comprises at least one of docketing, calendaring, accounting, or time and billing data, and wherein the second format comprises at least one of:
      a proprietary format, that is application specific, comprising at least one of docketing, calendaring, accounting, or time and billing data, or
      a non-proprietary format, wherein the data from the second software application comprises at least one of ODBC data, Cold Fusion data, relational database data, SQL data, HTML data, XML data, SOAP data, WAP data, IP data, TCP/IP data, HTTP data, FTP data, TIF data, JPG data, PDF data, ASCII data, Open Source data, ZMerge data, Windows-compatible data, Lotus Enterprise Integration data, or Lotus Notes data; and
   c. a processor configured to execute a legal services case management software application, wherein the software application is configured to:
      combine both the data received in the first format and the data received in the second format into a single record that is defined by the client identifier and the matter identifier, wherein the combined data is integrated in a format different from the first format and the second format; and
      provide the combined data to a user interface.

8. The system of claim 7, wherein the data in the first format is retrieved via an ODBC-compliant driver.

9. The system of claim 7, wherein the data in the project management application is incompatible for use by the software application.

10. The system of claim 7, wherein the combined data is in a portable format.

11. The system of claim 7, wherein the combined data is in a non-portable format.

12. The method of claim 2, further comprising:
   g. accessing the case management software application; and
   h. accessing said combined data stored in the storage accessible by the case management software application.

13. The method of claim 1, wherein the data from the second distributed application is legally-related data comprising at least one of docketing, calendaring, accounting, or time and billing data.

* * * * *